(12) United States Patent
Wheeler

(10) Patent No.: US 10,999,711 B2
(45) Date of Patent: May 4, 2021

(54) APPARATUS AND SYSTEM FOR DISTRIBUTING AN BEHAVIOR STATE TO AN TERMINAL IN AN ENVIRONMENT

(71) Applicant: Clarence Wheeler, Atlanta, GA (US)

(72) Inventor: Clarence Wheeler, Atlanta, GA (US)

( * ) Notice: Subject to any disclaimer, the term of this patent is extended or adjusted under 35 U.S.C. 154(b) by 0 days.

(21) Appl. No.: 16/274,241

(22) Filed: Jun. 27, 2019

(65) Prior Publication Data
US 2019/0357015 A1 Nov. 21, 2019

(51) Int. Cl.
| H04W 4/06 | (2009.01) |
| H04L 29/06 | (2006.01) |
| H04M 19/04 | (2006.01) |
| H04W 12/06 | (2021.01) |
| G06K 9/00 | (2006.01) |
| H04M 1/72454 | (2021.01) |
| H04M 1/72463 | (2021.01) |

(52) U.S. Cl.
CPC .......... *H04W 4/06* (2013.01); *G06K 9/00288* (2013.01); *H04L 63/0861* (2013.01); *H04M 1/72454* (2021.01); *H04M 1/72463* (2021.01); *H04M 19/044* (2013.01); *H04W 12/06* (2013.01)

(58) Field of Classification Search
None
See application file for complete search history.

(56) References Cited

U.S. PATENT DOCUMENTS

| 6,477,361 | B1* | 11/2002 | LaGrotta | H04W 52/0235 455/343.1 |
| 10,084,879 | B2* | 9/2018 | Liu | H04W 8/183 |
| 2009/0163175 | A1* | 6/2009 | Shi | H04W 12/0608 455/411 |
| 2010/0311391 | A1* | 12/2010 | Siu | H04W 8/205 455/411 |
| 2010/0311402 | A1* | 12/2010 | Srinivasan | H04W 4/60 455/418 |
| 2011/0117962 | A1* | 5/2011 | Qiu | H04W 48/18 455/558 |
| 2017/0170856 | A1* | 6/2017 | Shen | H04W 12/0023 |

* cited by examiner

*Primary Examiner* — Kenny S Lin

(57) ABSTRACT

The present invention discloses an system configured to distributed an behavior state signal to an subscriber terminal when the subscriber comes within an predetermine region of the environment. The system comprises of an plurality of A/V recording and communication apparatus arranging at an predetermine region of the environment, an behavior state processing unit configured to obtain and distribute data to and from components of the system, subscriber terminal and the one or more VSIM severs of the terminal service provider. The service provider further comprises an VSIM server configured to distribute one or more behavior state signals to the one or more subscriber terminals.

14 Claims, 19 Drawing Sheets

| "Behavior State" | "Ringtone/Notification Volume Adjustment Tone/Volume Level Position" | "Output Action Threshold" |
|---|---|---|
| Behavior State 1 | 0 "Silent Mode/DND" | T0 |
| Behavior State 2 | 1 "Vibrate Mode" | T1 |
| " | 2 | T2 |
| " | 3 | T3 |
| " | 4 | T4 |
| " | 5 | T5 |
| " | 6 | T6 |
| " | 7 | T7 |
| " | 8 | T8 |
| " | 9 | T9 |
| " | 10 | T10 |
| " | 11 | T11 |
| " | 12 | T12 |
| " | 13 | T13 |
| " | 14 | T14 |
| " | 15 | T15 |
| " | 16 | T16 |
| "OBS" | Upon Determination | Upon Determination |

Behavior State Adjustment App 9

APPARATUS AND SYSTEM FOR DISTRIBUTING AN BEHAVIOR STATE TO AN TERMINAL IN AN ENVIRONMENT

BACKGROUND OF THE INVENTION

Field of the Invention

The present invention relates to terminals, systems and method to adjust one or more states (e.g., ring-tone/notification volume level and powering on/off) of an terminal automatically upon obtaining an signal via an external apparatus.

BRIEF SUMMARY OF THE PRESENT INVENTION AND ADVANTAGES

The present invention is directed to a system and corresponding method for respectively controlling an subscriber terminal behavior state (e.g., ringtone/notification volume level and power on/off) when the subscriber of the terminal is within an predetermine region of an environment. For the purpose of summarizing, certain aspects, advantages, and features of the present invention has been described herein. In accordance with one or more embodiments, a method for adjusting the behavior state of a subscriber terminal in relationship to when the subscriber is at an predetermine region of the environment is provided. The method comprises one or more A/V recording and communication apparatus within the environment obtaining biometric data of the subscriber to determine an match of identity with prior stored biometric data; and one or more VSIM servers of the service provider configured to distribute at lease one behavior state signal (e.g., volume control signal or power-down control signal) to the subscriber terminal causing the subscriber terminal to preform at one behavior state at which the distributed behavior state signal pertains to. The behavior state signal represents adjusting the subscriber terminal ringtone/notification volume level or powering-down of the subscriber terminal.

In response to the subscriber terminal obtaining an power-down control signal, the subscriber terminal goes into a partial sleep mode for a discrete interval of time. The power-down control signal can consist of an power-down control signal and an behavior state duration control signal, further the behavior state duration signal determines the predetermine duration of the sleep mode, in Reference to U.S. Pat. No. 6,477,361.

The subscriber terminal can comprise at lease one application that allocates the subscriber terminal to adjust the ringtone/notification volume levels via an volume adjusting device via obtaining an behavior state signal. The system can include an plurality of A/V recording and communication apparatus that obtain biometric data and distribute the data to the behavior state processing unit. The system comprises an behavior state processing unit which can obtain and process data and distribute data to an server and other components of the system. These and other embodiments of the present invention will also become readily apparent to those skilled in the arts from the following detailed description of the embodiments having reference to the attached figures, the invention not being limited to any particular embodiments disclosed.

BRIEF DESCRIPTION OF THE SEVERAL VIEWS OF THE DRAWINGS

A more complete understanding of the present invention is derived by referring to the detailed description and claims when considered in connection with the Figures, wherein like reference numbers refer to similar items throughout the Figures.

In accordance with the present invention, the subscriber terminal is capable of automatically adjusting the ringtone/notification volume levels in response to obtaining an behavior state signal via the service provider VSIM server via the cellular network, the subscriber terminal may include one or more applications stored on is memory which determines the behavior state at which the terminal may preform at and a volume adjusting device for adjusting the ringtone/notification volume levels to an predetermine volume level. In the wireless communications network, the memory comprises an virtual subscriber identity module (VSIM) memory that can contain the behavior states (e.g., ringtone/notification volume levels) for the given behavior states volume levels for an respective subscriber. In accordance with another aspect of the present invention, a method is provided for automatically adjusting the subscriber terminal behavior state from one state to another, in response to obtaining an behavior state signal via the VSIM server of the terminal service provider within the wireless communications network, comprising the steps of one or more A/V recording and communication apparatus obtaining biometric data of the one or more subscribers when the subscriber is in an predetermine region of the environment and distributing the biometric data to the behavior state processing unit, and the behavior state processing unit obtaining and processing the biometric data to determine an match with prior stored biometric data, the behavior state processing unit distributing an subscriber authentication signal to the one or more VSIM servers of the service provider and the VSIM server distributing an behavior state signal to one or more subscriber terminals via the cellular network causing the subscriber terminal to automatically adjusting from one behavior state to the obtained behavior state associated with the obtained behavior state signal.

FIG. 8A illustrates of the behavior state adjustment application and subscriber behavior state database stored within the subscriber terminal.

DESCRIPTION OF THE EMBODIMENT(S)

The numerous innovative teachings of the present invention will be described with particular reference to the preferred embodiments disclosed herein. However, it should be understood that the embodiments described provided only a few examples of the many advantages uses and innovative teachings herein. In general, statements made in the specifications of the present application do not necessarily delimit any of the various claimed inventions. Moreover, the term terminal may refer to any one or all of cellular telephones, personal data assistants (PDAs), palm-top computers, laptop computers, wireless electronic mail receivers, multimedia Internet enabled cellular telephones, smart-watches and similar personal electronic devices which include a programmable processor and memory. In a preferred embodiment, the terminal(s) are cellular handsets that can communicate via any suitable wireless communication network known to one skilled in the art(s).

Figure 1:
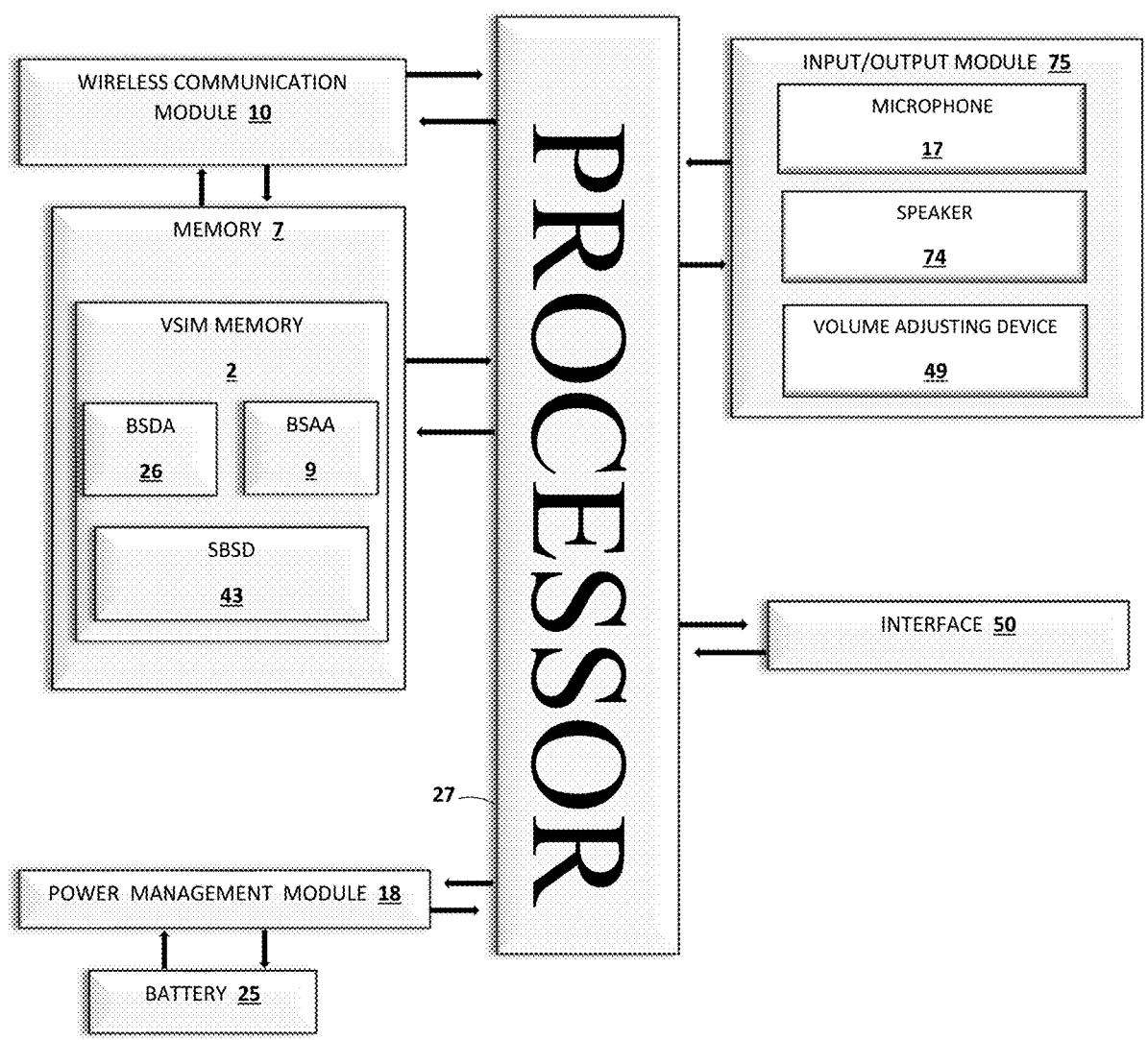
FIG. 1 illustrates an subscriber terminal embodiment according to one embodiment.

According to FIG. 1 the subscriber terminal 1 comprises an wireless communication module 10 which allows wireless communication which may enable the remote interaction between subscriber terminal 1 and the wireless communication network via an antenna(s), which may include communication systems as GSM (Global System for Mobile Communication) TDMA, CDMA (Code Division Multiple Access), PAN (Personal Area Network), NFC (Near Field Communication). Zigbee, RFID (Radio Frequency Identification), IrDA, (Infrared Data Association), LAN (Local Area Network), WIFI, MAN (Metropolitan Area Network) WiMAX (World Interoperability for Microwave Access), HSDPA (High Speed Downlink Packet Access), WAN (Wide Area Network), Wibro (Wireless Broadband), UMTS, LTE, 5g and 6g ($5^{th}$ and 6 Generation Wireless System), OFDM (Orthogonal Frequency-Division Multiple Access), MC-CDMA (Multi-Carrier Code-Division Multiple-Access), UWB (Ultra-Wideband), IPV6 (Internet Protocol Version 6), ISDB-T (Integrated Services Digital Broadcast-Terrestrial) and RF (Radio Frequency) communication systems. These varieties of wireless communication systems may be intergraded into the subscriber terminal 1 wireless communication module 10 intended to serve many different tasks which may be to transmit voice, video, and data in local and wide range areas, by sending magnetism signals through the air, transmitters and receivers may be positioned at a certain position, using an aerial or antenna, at the transmitter the electrical signal leave the antenna to create electromagnetic waves that radiate outwards to wirelessly communicate. The wireless communication module 10 may include a processor for processing data transmitted/received through a corresponding module and or may be included in one integrated chip (IC) or IC package. The RF module, for example, may be used to transmit/receive communication signals. The RF module may include a transceiver, a power amp module (PAM), a frequency filter, a low noise amplifier (LNA), or an antenna. A cellular module, WIFI module, may transmit/receive RF signals through a separate RF module.

Furthermore, the subscriber terminal 1 include an processor 27 which controls a multitude of hardware or software components that may be connected thereon and may also perform various data processing and operations by executing an operating system, application program, or operating system and application instructions. The processor 27 may be implemented with a system on chip (SoC). The processor 27 may further include a graphic processing unit (GPU) and/or an image signal processor. The processor 27 can execute one or more programs stored within the memory 7 and control the general operation of the program.

The subscriber terminal 1 interface 50 includes a universal serial bus (USB), or an optical interface.

Additionally or alternatively, the interface 50 can include a mobile high definition link (MHL) interface, a secure Digital (SD) card/multi-media card (MMC) interface, or an infrared data association (IrDA) standard interface. The interface 50 can act as a passage for supplying the subscriber terminal 1 with power from a cradle or delivering various command signals input from the cradle if the subscriber terminal 1 is connected to an external cradle. Each of the various command signals input from the cradle or the power may operate as a signal enabling the subscriber terminal 1 to recognize that it is correctly loaded in the cradle. The interface 50 may be coupled to the subscriber terminal 1 with external devices, such as wired/wireless head phones, external chargers, power supplies, storage devices configured to store data (e.g., audio, video, pictures, etc.), earphones, and microphones, etc. In addition, the interface 50 may use a wired/wireless data port, a card socket (e.g., for coupling to a memory card, a Subscriber identity module (SIM) card, a user identity module (UIM) card, a removable user identity module (RUIM) card, etc.), audio input/output ports and/or video input/output ports, for example.

In particular, the subscriber terminal 1 may comprise an input/output module 75 comprising an speaker 74 and an microphone 17. The speaker 74 may receive call mode, voice recognition, voice recording, and broadcast reception mode from the wireless communication module 10 and or output audio sound or sound data that may be stored inside of the terminal 1 memory 7, external storage, or transmitted from an external device. For example, the subscriber terminal 1 can comprise of multiple ring-tone/notification volume levels output from one component of the input/output module 75 such as the speaker 74. For example, the input/output module 75 can comprise of, but is not limited to sixteen ringtone/notification volume levels designated as "0", "1", "2", "3", "4", "5", "6", "7", "8", "9", "10", "11", "12", "13", "14", "15", "16". Further, each respective volume level with an higher value than an preceding lower value comprises an higher volume level output than the volume level below. For instance, volume level "1" represents an behavior state at which the subscriber terminal 1 is in silent mode (SM) behavior state 1 (BS1), whereas upon obtain an incoming phone-call, notification or message(s), not limited to, SMS messages, (e.g., text-messages, news alert messages, financial information messages, logos, ring-tones and the like) e-mail messages, multimedia messaging service messages (MMS) (e.g., graphics, animations, pictures, video clips, etc.) the ring-tone/notification volume level output from the input/output module 75 is completely silent. For instance, volume level "2" represents an behavior state at which the subscriber terminal 1 is in vibrate mode (VM) behavior state 2 (BS2), whereas upon obtain an incoming phone-call, notification or message(s) the processor 27 causes the battery or an vibrating component to preform an vibrating motion as a notification to the user alerting the user of an incoming phone-call and/or message(s). More of, volume levels "3-16" represents an behavior state at which the input/output module 75 speaker outputs an ring-tone/notification volume level in response to obtaining an incoming phone-call, notification or message(s), whereas the volume levels of the ring-tone can vary low or high depending on the volume levels at which the ring-tone/notification is set at in conjunction with the volume adjusting device 49 with volume level "3" the lowest, volume level "8" the medium and volume level "16" the highest according to output levels.

More of, the subscriber terminal 1 can comprise of "16" ringtone/notification volume adjustment tones (R/NVAT) which respectively corresponds with the "16" ring-tone/notification volume levels. The ringtone/notification volume adjustment tone (R/NVAT) can be an beeping sound or the likes output via one component of the input/output module 75 (e.g., speaker 74) in response to the user interacting with an physical button on the subscriber terminal 1 to adjust the volume levels of the ringtone/notification volume levels. More of, each respective ringtone/notification volume adjustment tone (R/NVAT) volume level with an higher value than an preceding ringtone/notification volume adjustment tone (R/NVAT) comprises an higher volume level output than the preceding ringtone/notification volume adjustment tone (R/NVAT) volume level. For instance, in response to an user manually interacting with an input/output module 75 such as an button on the subscriber terminal 1 to adjust the ringtone/notification volume levels the input/output module 75 (e.g., speaker 74) can output an ringtone/notification volume adjustment tone (R/NVAT) (e.g., an beeping sound or the likes) for each respective ring-tone/notification volume adjustment tone (R/NVAT), the volume level of each ringtone/notification volume adjustment tone (R/NVAT) can be higher or lower than an corresponding volume adjustment tone (VAT) depending on if the user adjust the ring-tone/notification volume level up or down.

The input/output module 75 can include an microphone 17 configured to obtain an external or internal noise such as the ringtone/notification volume adjustment tone (R/NVAT).

The subscriber terminal 1 can compose an sound measuring device (SMD) 31 (e.g., such as an volume sensor or the likes) configured to obtain and measure (e.g., in dB) external and internal sounds such as the ringtone/notification volume adjustment tone (R/NVAT) etc. The sound measuring device (SMD) 31 may obtain external and/or internal sounds from the microphone 17 associated with the subscriber terminal 1 or from another component of the input/output module 75 (e.g., such as the speaker 74) within the subscriber terminal 1.

The subscriber terminal 1 further comprises at lease one volume adjusting device 49, which allocates the subscriber to increase or decrease the input/output module 75 volume via instructions provided via a user manually pressing an input button(s) interacting with the user interface or navigating at lease one menu to select an desired volume level via the subscriber terminal 1 display, or in agreement with instructions provided via the behavior state adjustment application (BSAA) 9, the behavior state adjustment application 9 allocates the volume adjusting device 49 to be controlled via the subscriber terminal 1 obtaining at lease one behavior state signal (power-down control signal or volume control signal) via the VSIM server 2.

Furthermore, the input/output module 75 speaker 74, microphone 17, sound measuring device 31 and volume adjustment device 49 can be embedded in the same electrical module. Alternatively, each of said devices either individually or in combination may comprise one or more electrical modules or components that operate to send or receive control signals to the processor 27 in accordance with instructions dictated by the behavior state adjustment application 9 and/or control software.

The subscriber terminal 1 further includes a battery 25, such as a vibrating battery pack, for powering various circuits and components that is required to operate the subscriber terminal 1, as well as optionally providing mechanical vibration as a detectable output. For instance, when the subscriber terminal 1 obtains an behavior state signal (e.g., behavior state 2) via the VSIM server 99 the ringtone/notification adjustment tone position is set or adjusted to "2" and the battery pack is capable of vibrating the subscriber terminal 1. In this regard, volume level "2" correspond to vibrate mode (VM) behavior state 2 (BS2).

The subscriber terminal 1 includes an memory 7, an internal memory that may comprise a SSD (Solid State Drive), NAS (Network Attached Storage), Dual-Channel RAM (Random Access Memory), Multi-ROM (Read-Only Memory), Flash Memory (Flash Memory Type), Hard Disk (Hard Disk Type), Multimedia Card Micro (Multimedia Card Micro Type), SRAM (Static Random Access Memory), EEPROM (Electrically Erasable Programmable Read-Only Memory). PROM (Programmable Read-Only Memory), may further include a card type memory Compact Flash (CF), Secure Digital (SD), Micro Micro-SD, Mini-SD, Extreme Digital (xD), Multimedia Card (MMC) or a memory stick. The external memory may be functionally and/or physically connected to the subscriber terminal 1, these components may preform processing cores and dedicated graphics, alternatively some components of the memory 7 may store the subscriber terminal 1 operating system components, application data, and critical system files, many of the previously mentioned files and systems may be separated to different storage chips throughout subscriber terminal 1 printed circuit-board. The memory 7 can further store the subscriber-related information, the subscriber's volume control data, and associated software supporting the behavior state adjustment application (BSAA) 9. The memory 7 can store instructions and or codes to power-off, power-up and adjust the volume levels of the subscriber terminal 1.

The memory 7 includes a VSIM memory 2 which is used to store the provisioning information of one or more enabled VSIM subscriptions. The VSIM memory 2 may be a partition within the subscriber terminal 1 internal memory 7 or may be a separate internal memory unit. In addition, the VSIM memory unit 2 may store personal data downloaded from the one or more VSIM servers 99 for use with applications being executed on the subscriber terminal 1 processor 6.

For instance; when creating an account or subscription the subscriber can accomplish this over an cellular communication network or by using an external computer that is connected to the Internet. Such an account can be created by the user entering personal information into a webpage or into the subscriber terminal 1.

During the process, the user can create an account name (or user name) which is an arbitrary but unique account name that will be associated with the specific terminal 1 being registered to the network. The account activation can also require the user to enter a password to be associated with the user account for accessing the account in the event of changing personal information and obtain an new terminal 1, the user's biographical information and user account name are stored as a file in the Virtual SIM Database (VSIMD) 41 via the VSIM server 99 via the subscriber terminal 1 over the network 21. Further, setting up the user account, the user can be prompted to enter authentication credentials prior to transferring data at the time the account is being created that will be used in subsequent sessions to authenticate each user prior to granting access to the sensitive information. Any of a number of authentication methods can be employed, including password verification, biometric recognition, and a combination thereof. The authentication credentials can be obtained by the VSIM server 99 via the subscriber terminal 1 over the network 21 or through the an external computer via an Internet link and distributed to the authentication database 52 via the authentication server 32 and is stored as an authentication file associated with the user account name. The authentication credential can be a simple alphanumeric password. Next, the user is prompted to create an virtual identification card (VIC) to be used for authenticating an subscriber via facial recognition when the subscriber is within an predetermine region of the environment 100. The virtual identification card (VIC) may be the like(s) of an digital or virtual drivers license, identification card, school identification card or employment identification card.

During the process of creating the virtual identification card (VIC) the user is prompted to enter personal information such as an first and last name into an personal information field within the virtual identification card (VIC). Following, the user is prompted to capture an acceptable face-shot of themselves via the camera module arranged on their terminal or upload an acceptable face-shot image that is stored in the terminal 1 memory 7 if the face image is accepted the face image is then attached to an image field within the virtual identification card (VIC), this step allocates the behavior state processing unit 46 to preform an matching/comparing task with contextual biometric data obtained by one or more A/V recording and communication apparatus 14 within the environment 100 with the photo attached to the virtual identification card (VIC). Upon completion of attaching an acceptable image, the application or web page random generates an authentication key and associates the authentication key within an field on the virtual identification card, this may be done by way of the user being prompted to click on an button labeled generate authentication key. Specifically, the authentication key comprises of the first initial of the subscriber first name, followed by the subscriber complete last name and an randomly generated seven digit alphanumeric.

For example, an subscriber name John Sims authentication key may be JSim9U07P19. Further, the biological information and subscriber key is stored in the service provider database 60 of the VSIM server 99.

Once the user account and authentication credentials is established and stored in one or more databases, and the authentication key is generated the virtual identification card (VIC) is transferred to the virtual identification card store (VICS) 12 via the VSIM server 99 via the behavior state processing unit 46.

The VSIM memory 2 comprises an behavior state adjustment application (BSAA) 9 which may analyze an obtain an behavior state signal (BSS) (e.g., volume-control signal) via the VSIM server 99 and distribute an volume-control signal request to the volume adjusting device 49 to adjust the ringtone/notification volume level. For instance, the behavior state adjustment application 9 may obtain an behavior state signal (BSS) via the VSIM server 99, in response the behavior state adjustment application 9 may analyze the data associated with the obtained behavior state signal (BSS) and compare the obtained signal data with behavior state data associated within the subscriber behavior state database 43 to adjust the subscriber terminal 1 behavior state (e.g., ringtone/notification volume level) from one to another by way of the volume adjustment device 49.

The VSIM memory 2 comprises an subscriber behavior state database (SBSD) 43 that comprises data such as the ring-tone/notification volume adjustment tone (R/NVAT) volume level position on the sound bar/meter 67 and volume levels in the form of "output action threshold"; for instance, behavior state 1 (BS1) may be equivalent to position "0" on the sound bar/meter 67 and the volume level threshold may be "output action threshold" T0 within the subscriber behavior state database 43 which would be silent mode/do not disturb mode (SM/DNDM), and behavior state 2 (BS2) may be equivalent to position "1" on the sound bar/meter 67 and the volume level threshold may be "output action threshold" T1 within the subscriber behavior state database 43 which would be vibrating mode (VM). The subscriber behavior state database (SBSD) 43 may also be updated with the subscriber terminal 1 original behavior state (OBS) prior to obtaining an predetermine behavior state signal.

The VSIM memory 2 comprises an behavior state duration application (BSDA) 26 that, when processed by the processor 27 enables the processor 27 to: obtain and analyze data associated with an behavior state duration signal and generate one or more timers and associate the one or more timers with an predetermine schedule portion (behavior state duration time), wherein upon the one or more timers reaching an value of 0:00:00 the processor 6 generates an original behavior state signal instructing the behavior state adjustment application 9 to adjust the subscriber terminal 1 back to its original behavior state (OBS) via the behavior state duration application 26 sending one or more control signal request to the volume adjustment device 49. In addition the one or more timers may correspond with the one or more timers associated with the behavior state processing unit(s) 46 behavior state duration application 36. Further, the timer associated with the behavior state duration application 26 is the likes of an count-down timer.

In addition the timer may be associated with an identifier that may distinguish an opposing timer from another.

For instance, upon receipt of the behavior state duration application 26 obtaining an behavior state duration signal and generating one or more timers and associating the one or more timers with one or more predetermine schedule portions total times (e.g., behavior state duration time), the behavior state duration application 36 associated with the behavior state processing unit 46 may also comprise one or more timers associated with the same predetermine schedule portion total time as the subscriber terminal 1 one or more timers, so that when the one or more timers of the behavior state duration application 26 elapse the subscriber terminal 1 is adjusted back to its original behavior state (OBS) (e.g., ringtone/notification volume level) and when the one or more timers of the behavior state duration application 36 timer elapse the behavior state processing unit 46 distributes an view-point signal to the one or more A/V recording and communication apparatus 14.

Further, the behavior state adjustment application 9, behavior state duration application 26 and subscriber behavior state database 43 may be uploaded to the subscriber terminal 1 VSIM memory 12 along with the provisioning data during the activation of the service provided by the service provider.

The above arrangements of the applications may be implemented in a computer-readable medium using, for example, computer software, hardware, or some combination thereof. For a hardware implementation, the above described arrangements may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a selective combination thereof arrangements may also be implemented by the processor 27. For a software implementation, the above described arrangements may be implemented with separate software modules, such as procedures and functions, each of which may perform one or more of the functions and operations described herein. The software codes may be implemented with a software application written in any suitable programming language and can be stored in a memory (e.g., the memory 7), and executed by the processor 27. The applications may be an web application, a native application, and or an mobile application (e.g., an app) downloaded from an digital distribution application platform that allows users to browse and download applications developed with mobile software development kits (SDKs).

Figure 2:
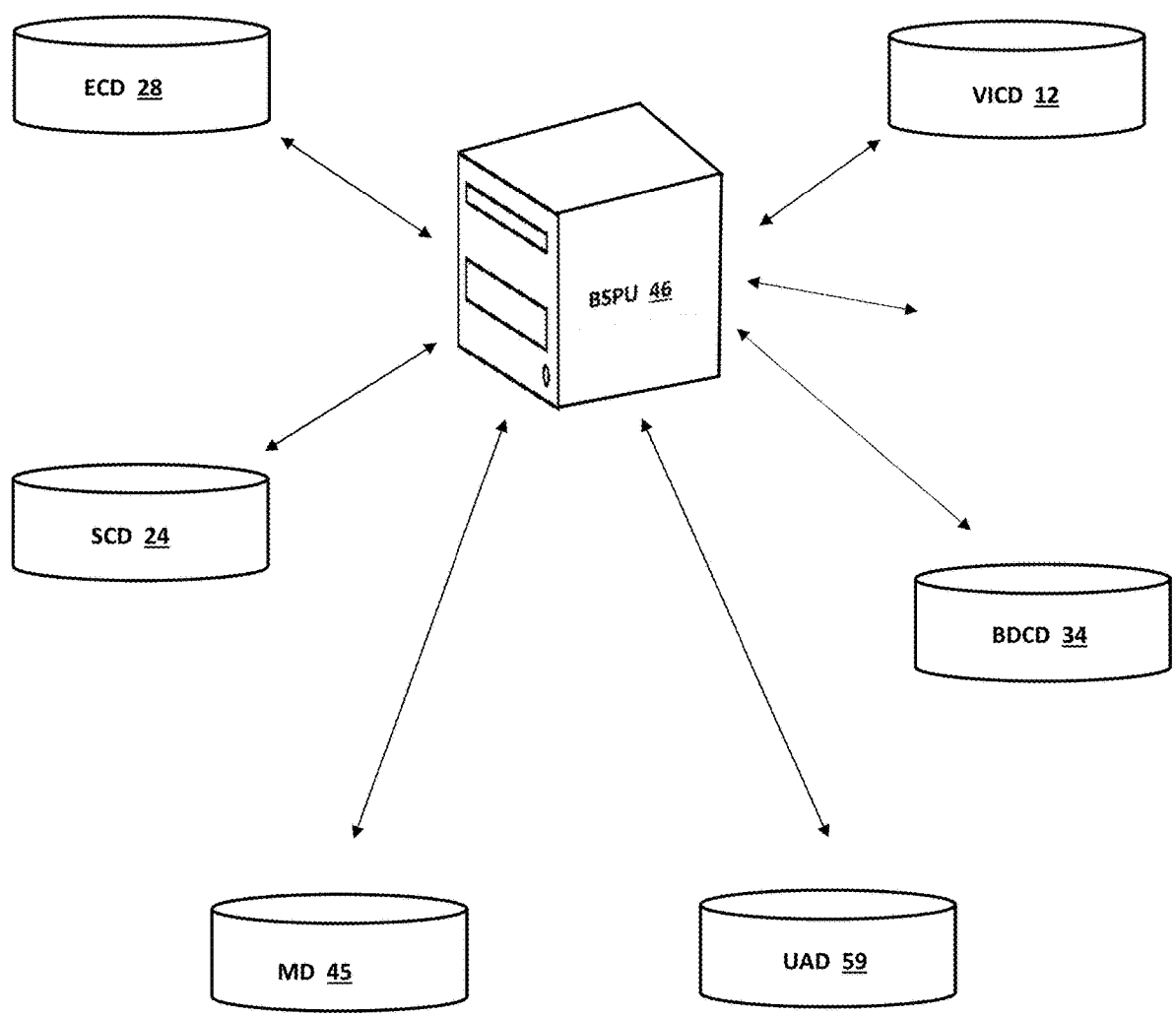
FIG. 2 illustrates the behavior state processing unit and database of the terminal behavior system according to one embodiment.

Referring to FIG. 2 illustrates an overall architecture of the terminal behavior system 5. The system further comprises an behavior state processing unit (BSPU) 46 which respectively obtains and distribute data and instruction to the A/V recording and communication apparatus 14, virtual identification card database (VICD) 12, user authentication database (UAD) 59, employee classifier database (ECD) 28, student classifier database (SCD) 24, miscellaneous database (MD) 93 and an biometric data classifier database 34. The virtual identification card database (VICD) 12 respectively store an virtual identification card(s) (VIC) for each subscriber operating on the system, further the virtual identification card comprises biographical information such as the subscriber first and last name, an digital photo of the subscriber and an respective subscribers authentication key, whereas the subscriber authentication key comprises the first initial of the subscriber first name, followed by the subscriber complete last name and an randomly generated seven digit alphanumeric.

The user authentication database 59 respectively store authentication credentials for each subscriber that has been authenticated via the facial recognition tasker application 30. For example, an subscriber biological and face data can be obtained, analyzed and authenticated under the control of the facial recognition processor 63, one or more databases 15 and applications 30, in response the accepted authentication credentials are stored within the user authentication database 59 as an user authentication file.

The employee classifier database 28 respectively store an employee classifier file for each subscriber that may be an employee of the environment 100.

The student classifier database 24 respectively store an student classifier file for each subscriber that may be an student of the environment 100.

The miscellaneous database 45 respectively store an classifier file for each subscriber that may be an visitor of the environment 100.

The biometric data database 34 respectively store an classifier file for an subscriber comprising biometric data.

Figure 3:
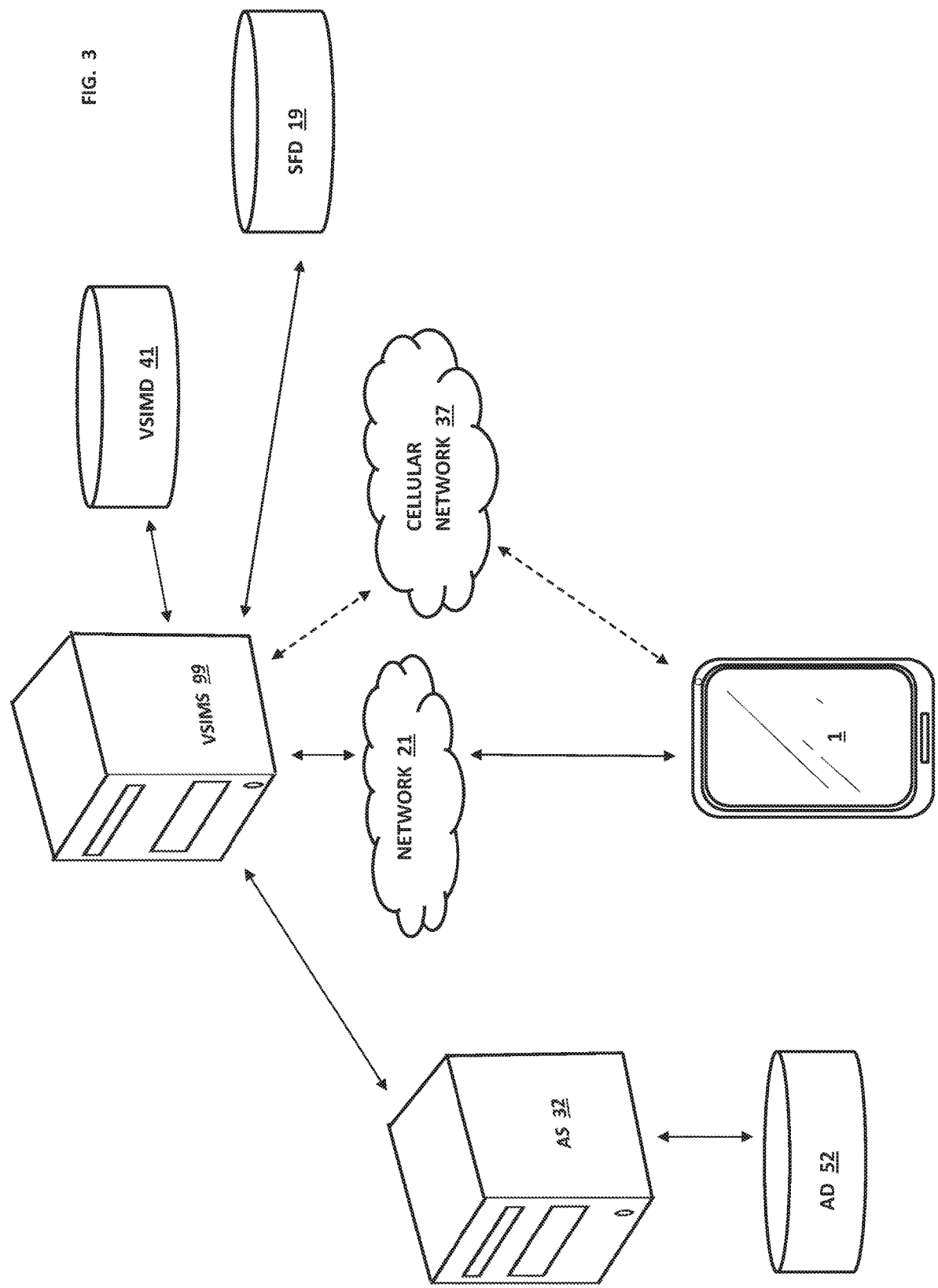
FIG. 3 illustrates an overall architecture of an embodiment of the Virtual SIM system that communicates with the components of terminal behavior state system and an subscriber terminal over a network according to another embodiment.

Referring to FIG. 3 illustrates an overall architecture of the service provider Terminal Behavior State Virtual SIM System that communicates with components of the Terminal Behavior State System (TBS) within the environment 100 via the network 21 and one or more subscriber terminals 1 via the cellular network 37. The Terminal Behavior State Virtual System comprises one or more VSIM servers 99, VSIM database 41, subscriber functionality database (SFD) 19, authentication server 32 and an authentication database 52.

The VSIM server 99 may be configured to obtain and distribute data and one or more behavior state signals (e.g., volume control signal or power-down signal) to and from the one or more subscriber terminals 1 over the network 21 or cellular network 37.

The VSIM database 41 may store the personal data information for each subscriber terminal 1 operating on the system.

The system comprises an subscriber functionality database 19 that stores information for one or more individuals comprising an subscription for the Terminal Behavior System Virtual SIM System. Specifically, the subscriber functionality database 19 comprises biological information, the subscriber terminal 1 identifier (e.g., terminal make and model), data pertaining to the hardware and software capabilities of the subscriber terminal 1, data pertaining to the amount of ringtone/notification volume adjustment tones an terminal may comprise, the position of the ringtone/notification volume adjustment tone arranged on the sound bar/meter 67, the mode (e.g., silent mode or vibrate mode) an subscriber terminal 1 may be in when the ringtone/notification volume adjustment tone is at an predetermine position on the sound bar/meter 67 and thresholds (e.g., "output action threshold") of each respective ringtone/notification volume adjustment tone of the subscriber terminal 1.

For instance, upon one or more subscribers obtaining one or more subscription provided by the service provider, the VSIM server 99 may search one or more manufactures and/or software and hardware developer sites and/or database by the subscriber terminal identifier (e.g., make and model), operating system, system software and control software to obtain the subscriber terminal 1 hardware and software capability's, the amount of ringtone/notification volume adjustment tones an terminal comprises, the position of the ringtone/notification volume adjustment tone arranged on the sound bar/meter 67, the mode (e.g., silent mode or vibrate mode) an subscriber terminal 1 may be in when the ringtone/notification volume adjustment tone is at an predetermine position on the sound bar/meter 67 and thresholds (e.g., "output action threshold") of each respective ringtone/notification volume adjustment tone. Upon determining the ringtone/notification volume adjustment tone position on the sound bar/meter 67, threshold (e.g., "threshold output action") and mode the terminal may be in upon an ringtone/notification volume adjustment tone arranging at an predetermine position on the sound bar/meter 67. The VSIM server 99 may generate an subscriber behavior state database 43 and associate the subscriber behavior state database 43 with an value for the ringtone/notification volume adjustment tone "position" on the sound bar/meter 67 and threshold (e.g., "threshold action output") and may associate the one or more ringtone/notifications volume adjustment tones with an behavior state (e.g., behavior state 1 or behavior state 2) upon completion the VSIM server may distribute the subscriber behavior state database 43 to the subscriber terminal 1.

The authentication server 62 may be in connection with the authentication database 52, to store the authentication credentials for each subscriber terminal 1 operating on the system as well.

The network 21 may be any type of network, such as Ethernet, To Firewire, USB, Blue Tooth, Fibre Channel, WiFi, IEEE 802. 11g, 802. 11n, 802. 11ac, WiMAX or other any other network type know to one skilled in the art(s).

The network 37 may be any type of cellular network such as LTE, UMTS, 5G, 6G, or any other cellular network type known to one skilled in the art(s).

Figure 4:
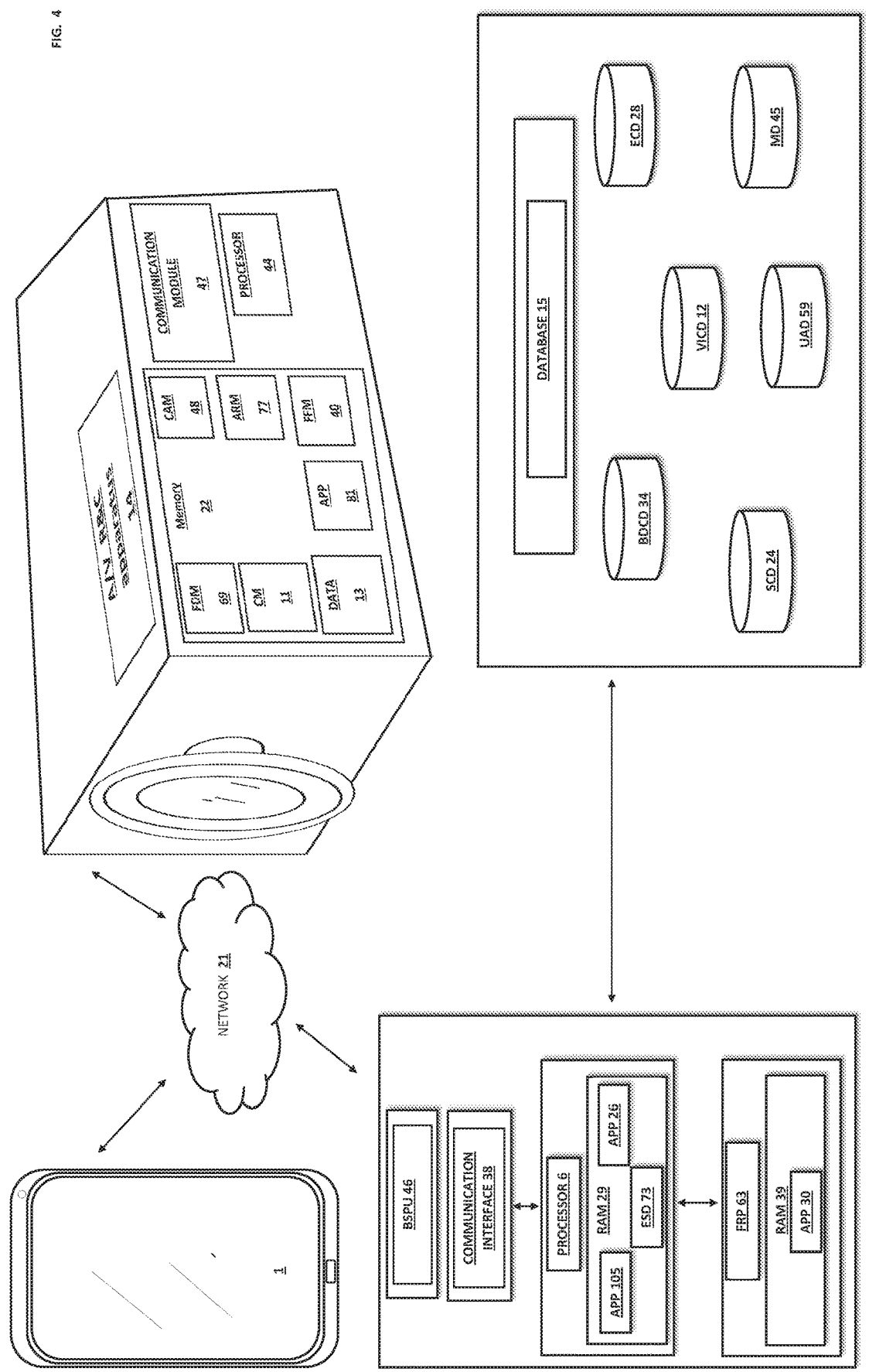
FIG. 4 illustrates an overall architecture of additional components of the terminal behavior system within the environment.

Referring to FIG. 4 is an diagram in depth of the terminal behavior system (TBS) 5 arranged within an predetermine region of the environment 100 according to an embodiment of the inventive concept.

The terminal behavior system (TBS) 5 comprises one or more A/V recording and communication apparatus 14 arranged at predetermine regions of the environment 100. The A/V recording and communication apparatus 14 may be the likes of an wireless-enabled digital camera module capable of capturing digital video and still images in its field of view. The A/V recording and communication apparatus 14 can be configured to record images periodically, (e.g. a fixed rate), or in response to one or more movement activities within a zone in front of the A/V recording and communication apparatus 14, (e.g., in response to a subscriber moving into position in view of the A/V recording and communication apparatus 14.

In one implementation, the A/V recording and communication apparatus 14 can be configured to record images at a low rate when activity is not detected within a zone in front of the A/V recording and communication apparatus 14 and to record images at an higher rate when activity is detected within the zone. In the preferred embodiment the A/V recording and communication apparatus 14, are configured to collect biometric data (e.g., facial data) from an subscriber to determine an match of the obtained contextual biometric data and with historical biometric data associated with the subscriber virtual identification card (VIC) stored in the virtual identification card database 12 in order to authenticate the subscriber via the facial recognition tasker application 30. As used herein, the term "biometric data" refers to data that can uniquely identify an subscriber among other humans (at an high degree of accuracy) based on the subscriber physical or behavioral characteristics.

Further, the obtained biometric data can comprise an unique identifier which can be used to characteristically distinguish one biometric data profile from another.

For example, the A/V recording and communication apparatus 14 role is to obtain biometric data at an predetermine main entrance(s) region within the environment 100. Additionally, the A/V recording and communication apparatus 14 may comprise an communication module 47 required to establish connections and wirelessly communicate with the behavior state processing unit 46 via the network 21. The A/V recording and communication apparatus 14 can communicate via communication systems such as PAN (Personal Area Network), Zigbee, LAN (Local Area Network), WIFI, MAN (Metropolitan Area Network) WiMAX (World Interoperability for Microwave Access), WAN (Wide Area Network), Wibro (Wireless Broadband), UWB (Ultra-Wideband), and IPV6 (Internet Protocol Version 6) communication systems. For example, the A/V recording and communication apparatus 14 can obtain biometric data and distribute the biometric data to one or more data stores 15 via the behavior state processing unit 46 via the network 21.

Furthermore, the A/V recording and communication apparatus 14 includes an processor 44 in connection with the memory 22 which controls a multitude of hardware or software components that may be connected thereon and may also perform various data processing and operations by executing an operating system, application program, or operating system and application instructions. The processor(s) may include a Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SOC), a programmable logic unit, a microprocessor, or any other device capable of performing operations in a defined manner.

The processor 44 may be configured, through a execution of computer readable instructions stored in the memory(s) program(s).

The A/V recoding and communication apparatus 14 include an memory 22 an internal memory that may comprise a SSD (Solid State Drive), NAS (Network Attached Storage), Dual-Channel RAM (Random Access Memory), Multi-ROM (Read-Only Memory), Flash Memory (Flash Memory Type), Hard Disk (Hard Disk Type), Multimedia Card Micro (Multimedia Card Micro Type), SRAM (Static Random Access Memory), EEPROM (Electrically Erasable Programmable Read-Only Memory), PROM (Programmable Read-Only Memory), may further include a card type memory Compact Flash (CF), Secure Digital (SD), Micro Micro-SD, Mini-SD, Extreme Digital (xD), Multimedia Card (MMC) or a memory stick.

In some examples, the memory(s) is a temporary memory, meaning that a primary purpose of the memory may not be long-term storage.

Additionally, the memory 22 comprises an face detector module (FDM) 69, characteristic Module (CM) 11, characteristic algorithm module (CAM) 48, Augmented Reality (ARM) module 77, face frame module (FFM) 40 and an application 81.

Each of the modules (including any sub-modules) may be implemented in hardware, firmware, software (e.g., program modules comprising computer-executable instructions), or any combination thereof. Each module may be implemented on/by one device, such as a computing device, or across multiple such devices. For example, one module may be implemented in a distributed fashion on/by multiple devices such as servers or elements of a network service or the like. Further, each module (including any sub-modules) may encompass one or more sub-modules or the like, and the modules may be implemented as separate modules, or any two or more may be combined in whole or in part. The division of modules (including any sub-modules) described herein in non-limiting and intended primarily to aid in describing aspects of the invention.

The face detector module 69 respectively obtain image data and depth data from an image sensor and depth-sensor in time, in frames, for instance, the image data can be obtained at 60 frames/second (fps), and depth data can be obtained at 15 fps. In response to detecting an face of an subscriber in the field of view and acquiring an respective position and size of an subscriber facial via the face detector module 69, the processor 44 can cause the recording or image capturing process to display at lease one face detection frame when an subscriber image and depth data is detected via an image and depth sensor, the face detection frame can surround the acquired face of the subscriber in the field of view of the A/V recording and communication apparatus 14. Upon detecting the subscriber face and image and depth data the face detector module 69 can generate an face base mesh metadata of the subscriber head and face and distributed the base mesh metadata to the memory 22 and behavior state processing unit 46 via the network 21 under the control of the processor 44. Any suitable techniques may be used by the face detector module 69 to detect an face of an individual.

The characteristic module 11 may obtain the face mesh data structure from the AR module 77, in response to the AR module 77 generating an face mesh data structure upon receipt of the A/V recording and communication apparatus 14 obtaining an view-point signal via the behavior state processing unit 46 and associate the face mesh data structure with characteristic points at areas of interest.

For instance, the characteristic module 11 can detect facial features at arears of interest; such as the eyes, noses, ears, mouths and eyebrows and associate one or more facial features with facial characteristic points, the characteristic module 69 can also detect detailed facial features such as the size of the subscriber eyes, the distance between the subscriber eyes, the shape and size of the subscriber nose, the size of the subscriber lips and the relative position of the subscriber eyes, nose and lips respectively or in combination and associate the detailed facial features with characteristic points. The characteristic module 11 can associate each set or each respective characteristic points of the face profile mesh and face mesh data structure with an characteristic identifier which may distinguish one set of characteristic points from another. The characteristic module 11 can further distribute the face mesh data structure to the characteristic algorithm module 48.

Any suitable techniques may be used by the characteristic module 11 to detect facial features and generate characteristic points with the detected facial features of the face mesh data structure.

The characteristic algorithm module 48 may obtain and analyze the face mesh data structure comprising characteristic points to determine an respective value for each respective set of characteristic point(s) associated with the respective face mesh data structure. For instance, the characteristic algorithm module 48 may generate an block grid on the face mesh data structure to determine an respective number value for each set of characteristic points.

The characteristic algorithm module 48 may generate an axis on specific regions of the face mesh data structure to determine an respective angle value for each set of characteristic points.

The characteristic algorithm module 48 may generate an circumference table on the face mesh data structure to determine an respective degree value for each set of characteristic points. In response, to the characteristic algorithm module 48 processing one or more characteristic point the characteristic algorithm module 48 can associate each respective set of characteristic points with an respective value such an number, angle or degree, in conjunction the face mesh data structure comprising an value associated with its characteristic points may be stored in the memory 22 temporary and/or distributed to the face fame module 40 under the control of the processor 44.

Any suitable algorithm techniques may be used by the characteristic module 11 to determine and associate an value with the characteristic points of the face mesh data structure.

The augmented reality (AR) module 77 respectively obtains image and depth data (e.g., face base mesh metadata) from the face detector module 69 or memory 22 to generate an face mesh data structure that represents an 3D depth profile of the face and head of the subscriber being used, the AR module 77 may then distributed the face mesh data (e.g., 3D depth profile) structure to the face frame module 40, application 81 or memory 22 under the control of the processor 44.

The face frame module 40 may obtain the face mesh data structure via the AR module 77 and generate an face profile match frame (FPMF) comprising the obtained face mesh data structure upon the A/V recording and communication apparatus 14 obtaining an v view-point signal via the behavior state processing unit 46 via the network 21.

For instance, upon receipt of the A/V recording and communication apparatus 14 obtaining an view-point signal (VPS) via the behavior state processing unit 46 the face frame module 40 respectively obtains the face mesh data structure and generates an face profile match frame (FPMF) comprising the face mesh data structure of the respective individual associated with the view-point signal.

The comparing module 82 may obtain an contextual face mesh data structure and an face mesh data structure associated with an face profile match frame generated in response to the A/V recording and communication apparatus 14 obtaining an view-point signal via the behavior state processing unit 46. Upon obtaining the contextual face mesh data structure and face mesh data structure associated with an face profile match frame generated in response to the A/V recording and communication apparatus 14 obtaining an view-point signal the comparing module 82 can preform an annalistic task to compare and determine equivalent values with the characteristic points associated with the contextual face mesh data structure generated in response to the A/V recording and communication apparatus 14 obtaining biometric data (e.g., image and depth data) and face mesh data structure associated with an face profile match frame generated in response to the A/V recording and communication apparatus 14 obtaining the view-point signal.

For instance, the contextual face mesh data structure may have characteristic points that determines the distance between the subscriber eyes with an value of 3.5, while face mesh data structure associated with an face profile match frame generated in response to the A/V recording and communication apparatus 14 obtaining an view-point signal may also have characteristic points that determines the distance between the individual eyes but with an value of 3.1 during the annalistic task the comparing module 82 may determine that the two values are not equivalent with each other, in response the face match profile frame is configured to alternate under the control of the processor 44. Any suitable matching/comparing task may be to determine an equivalent of values associated with the characteristic points of the face mesh data structure.

The memory 22 further stores an application 81 that, when processed by the processor 44, enables the processor 44 to: obtain an face match profile frame (FMPF) from the memory 22 and display the face match profile frame during the recording process. Further, during the recording process the face match profile frame is configured to alternate from an subscriber face to another subscriber face at an predetermine time of 1 to 2 seconds until the A/V recording and communication apparatus 14 obtains an equivalent value associated within the contextual face profile match frame and face profile match frame generated in response to the A/V recording and communication apparatus 14 obtaining the view-point signal.

For instance, during the recording process an plurality of subscriber may be within the field of view of the recording, further upon deployment of the face match profile frame the A/V recording and communication apparatus 14 may be configured to determine the present of an subscriber when the subscriber is in the field of view by way of an image or depth sensor associated to the A/V recording and communication apparatus 14 or any other sensing mean known to one skilled in the art(s).

Additionally, upon the A/V recording and communication apparatus 14 detecting the present of an subscriber the face match profile frame may assemble on the subscriber face region for an predetermine time until image and depth data is obtained the image and depth data may be obtained in time in frames, the obtained image and depth data may be processed via the an face detector module (FDM) 69, characteristic module (CM) 11, characteristic algorithm module (CAM) 48 and augmented reality (ARM) module 77.

Upon processing the contextual obtained image and depth data, where the augmented reality module 77 generating an mesh data structure of the image and depth data obtained by the face detector module 69, the characteristic module 11 associate the mesh data structure with characteristic points at areas of interest and the characteristic algorithm module 48 determining an respective value for each respective or set of characteristic points, in conclusion the comparing module 82 is configured to obtain the contextual mesh data structure and the mesh data structure associated with the face match profile frame and preform an annalistic task as to compare/match the characteristic points values associated with the contextual mesh data structure and mesh data structure associated with the face match profile frame, where if each value of each respective or set of characteristic points do not corresponds or match the face match profile frame is configured to alternate to the next individual face within the field of view of the recording.

The memory 22 can further (and optionally) store data 13 relating to image data and depth data obtained via an image sensor and depth sensor associated with the A/V recording and communication apparatus 14; for example, in some implementations, the one or more modules can distribute face profile mesh data and an image of the individual face to the memory 22 for later purposes. The memory(s) 22 can further store data 13 relating to characteristic points, axis's, profile base mesh's and identity base mesh's of an subscriber to be recalled during one or more called upon tasks.

The terminal behavior system (TBS) 5 comprises an behavior state processing unit 46 arranged within an predetermine region of the environment 100. The behavior state processing unit 46 may be an server or data processing unit configured to store, obtain and distribute vital data processing information and one or more signals to and from the one or more A/V recording and communication apparatus 14 and VSIM server 99 via the network 21.

The behavior state processing unit 46 comprises an processor 6, facial recognition processor 63, one or more memory(s) (29, 39), an communication interface 38 and an database 15 comprising, an virtual identification card database (VICD) 12, an biometric data classifier database (BDCD) 34, an employee classifier database (ECD) 28, student classifier database 24, miscellaneous database 45 and an user authentication database 59. The one or more A/V recording and communication apparatus 14 may communicate with the behavior state processing unit 46 by a wired or wireless connection via the network 21 to distribute and obtain data and one or more instructions via at lease one signal.

The behavior state processing unit 46 includes an processor 6 and facial recognition processor (FRP) 63 comprising software or hardware or an combination of the two, the processor(s) (6, 63) can be configured to control a multitude of hardware or software components that may be connected thereon and may also perform various data processing and operations by executing an operating system, application program, or operating system and application instructions stored within the memory (29, 39) described herein. Examples, of the processor(s) (6, 63) include one or more application-specific integrated circuits (ASICs), field programmable gate arrays (FPGAs) or digital signal processors (DSPs). Further, the facial recognition processor 63 can include an secure enclave processor (SEP) which stores an protects information used for identifying one terminal devices, biometric information operating system information and more.

The communication interfaces (CI) 38 can be provided as interface cards (sometimes referred to as "line cards"). Generally, they control the sending and receiving of data and data packets over a computing network and sometimes support other peripherals used with the behavior state processing unit 46. Among the interfaces that may be provided are Ethernet interfaces, frame relay interfaces, cable interfaces, DSL interfaces, token ring interfaces, and the like. In addition, various types of interfaces may be provided Such as, for example, universal serial bus (USB), Serial, Ethernet, Firewire, PCI, parallel, radio frequency (RF), cellular network interfaces, Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high speed serial interface (HSSI) interfaces, Point of Sale (POS) interfaces, fiber data distributed interfaces (FDDs), and the like. Generally, such communication interfaces 38 may include ports appropriate for communication with the appropriate media. In some cases, they may also include an independent processor and, in Some instances, volatile and/or nonvolatile memory (e.g., RAM).

The behavior state processing unit 46 include one or more memory(s) (29, 39) in conjunction with the processor(s) (6, 63), the memory(s) (29, 39) can be such as an internal memory that may comprise a SSD (Solid State Drive), NAS (Network Attached Storage), Dual-Channel RAM (Random Access Memory), Multi-ROM (Read-Only Memory), Flash Memory (Flash Memory Type), Hard Disk (Hard Disk Type), Multimedia Card Micro (Multimedia Card Micro Type), SRAM (Static Random Access Memory), EEPROM (Electrically Erasable Programmable Read-Only Memory), PROM (Programmable Read-Only Memory), may further include a card type memory Compact Flash (CF), Secure Digital (SD), Extreme Digital (xD), Multimedia Card (MMC) or a memory stick. For example, the memory (29,39) can store an plurality of data information such as applications, programs, hardware or software, and instructions for corresponding components of the terminal behavior system (TBS) 5, such described data information will be later explained herein.

The memory 39 further stores an facial recognition tasker application (FRTA) 30 that, when processed by the facial recognition processor (FRP) 63, enables the facial recognition processor 63 to: respectively analyze and compare the obtained contextual biometric data via the A/V recording and communication apparatus 14 with historical biometric data (e.g., digital image associated on the virtual identification card (VIC)) stored in the VICD 12. If the facial recognition processor 63 determines an match is found between the obtained contextual biometric data and stored historical biometric data the subscriber authentication credentials are stored in the user authentication store 59 as an user authentication file.

Additionally, upon receipt of determining an respective match of contextual biometric data with historical biometric data associated with an respective virtual identification card, the facial recognition tasker application 30 is also configured to crop and extract specific data associated with an respective virtual identification card such as the subscriber name and subscriber authentication key 83 and associate this information with an respective user authentication file within the user authentication database 59. The facial recognition tasker application 30 may also associate each respective user authentication file with an identifier that may distinguish one file from another.

Many facial recognition techniques can be used in operation with the facial recognition tasker application 30. For instance, techniques can be used that distinguish an face from other features and measure the various features of the face. Every face has numerous, distinguishable landmarks, and different peaks and valleys that make up respective facial features. The landmarks can be used to define a plurality of nodal points on a face, which can include information about the distance between an individual eyes, the width of the individual nose, the depth of the individual eye sockets, the shape of the user's cheekbones, the length of the individual jaw line. The nodal points of the individual face can be determined from one or more images of an individual face to create a numerical code, known as a faceprint, representing the individual face. The facial recognition can also be performed based on three-dimensional images of the individual face or based on a plurality of two-dimensional images which together can provide three-dimensional information about the individual face. Three-dimensional facial recognition uses distinctive features of the face (e.g., where rigid tissue and bone is most apparent, such as the curves of the eye socket, nose and chin, to identify the individual and to generate a faceprint of the individual. The faceprint of a user can include quantifiable data such as a set of numbers that represent the features on a individual face.

The memory 29 further stores an behavior state algorithm application (BSAA) 105 that, when processed by the processor 6, enables the processor 6 to: analyze and obtain an subscriber schedule data from the employee classifier database 28, student database 24 or miscellaneous database 45, in response the behavior state adjustment application 105 respectively bifurcate the subscriber schedule data into respective portions to preform one or more equation task in order determine an predetermine behavior state duration time and behavior state duration grace period time, upon receipt of the facial recognition tasker application 30 authenticating the respective subscriber. For instance, if the subscriber is an employee of the environment 100 and the subscriber day work schedule is 8a.m. (start time) and 5p.m. (end time) and an 1-hour lunch-brake at 12:00 p.m. The behavior state duration algorithm application 105 obtains an report of the subscriber schedule data from the employee classifier database 28. Further, the schedule data is bifurcated into an first schedule portion and second schedule portion; wherein the first schedule portion comprises the time range of 8 a.m. (start-time) to 12:00 p.m. (end-time), and the second schedule portion comprises the time range of 1 p.m. (start-time) to 5 p.m. (end-time).

Upon bifurcating the schedule data into respective portions the behavior state duration application 105 preform an first equation process; wherein the first schedule portion end-time is subtracted by an 10-minutes (grace-period) respectively reducing the first schedule portion end-time by 10-minutes and the first schedule portion overall time; wherein the 12:00 p.m. (end-time) is subtracted by an 10-mins (grace-period), 12:00 (end-time)–:10=11:50 (end-time), in response to subtracting the first schedule portion end-time by 10-minutes the first schedule portion overall time is reduced to 8 a.m. (start-time) to 11:50 a.m. (end-time).

Further, the behavior state duration algorithm application 105 preforms an second equation process as to determining the total amount of time of the reduced first schedule portion and second schedule portion respectively; wherein the reduced first schedule portion start-time is subtracted by the reduced first schedule portion end-time to respectively determine the total amount of time of the reduced first schedule portion, 8:00 a.m. (start-time)–11:50 a.m. (end-time)=3.50 hr., and the second schedule portion start-time is subtracted by the second schedule portion end-time, 1 p.m. (start-time)–5 p.m. (end-time)=4 hr. The behavior state duration algorithm application 105 can be configured to format the reduced first schedule portion and second schedule portion into an format better understood by the behavior state duration application 26 timer. Further, the behavior state duration algorithm application 105 can distribute the above mentioned schedule portion(s) to the behavior state duration application 26 under the control of the processor 44.

For instance, if the subscriber is an student of the environment 100 and the individual first class is 9 a.m. (start time) to 10a.m. (end time), second class 10:30 a.m. (start-time) to 11:30 a.m. (end-time) and the third class 11:35 a.m. (start-time) to 12:35 p.m. (end-time). The behavior state duration algorithm application 105 obtains an report of the individual schedule data from the student classifier database 24, bifurcating the class schedule into respective portion(s) and preforms an equation process on the portion(s); wherein the first schedule data portion comprises the first class time range of 9 a.m. (start-time) to 10:00 a.m. (end-time), second schedule portion comprises the second class time range of 10:30 a.m. (start-time) to 11:30 a.m. (end-time) and the third schedule portion comprises the third class time range of 11:35 a.m. (start-time) to 12:35 p.m. (end-time).

Secondly, the behavior state duration algorithm application 105 preforms an first equation process as to determining the total amount of time of the first schedule portion, second schedule portion and third schedule portion respectively; wherein the first schedule portion start-time is subtracted by the first schedule portion end-time, 9:00 a.m. (start-time)–10:00 a.m. (end-time)=1 hr., the second schedule portion start-time is subtracted by the second schedule portion end-time, 10:30 a.m. (start-time)–11:30 a.m. (end-time)=1 hr and the third schedule portion start-time is subtracted by the third schedule portion end-time, 11:35 a.m. (start-time)–12:35 p.m. (end-time)=1 hr.

Next, the behavior state algorithm application 105 respectively preforms an second equation process with an predetermine time associated with the first schedule portion and second schedule portion to determine an respective grace period of the first and second schedule portion(s); wherein the first schedule portion end-time is subtracted by the second schedule portion start-time, 10:00 (fsp end-time)–10:30 (ssp start-time)=:30 grace period, and the second schedule portion end-time is subtracted by the third schedule portion start-time, 11:30 (ssp end-time)–11:35 (tsp start-time)=:05 grace period.

The behavior state duration algorithm application 105 can be configured to format the above mentioned schedule portion(s) and grace periods into an format better understood by the behavior state duration application 26 timer. Additionally, the behavior state duration algorithm application 105 can distribute the first schedule portion along with its grace period and second schedule portion along with its grace period and third schedule portion to the behavior state duration application 26 under the control of the processor 44. Any suitable algorithm techniques may be used by the behavior state algorithm application 105 to determine an total time of an respective grace period.

The memory 29 further stores an behavior state duration application (BSDA) 26 that, when processed by the processor 6, enables the processor 6 to: respectively generate an behavior state duration timer file comprising an timer upon receipt of obtaining at lease one schedule portion or grace period via the behavior state duration algorithm application 105, further associating the behavior state duration timer file timer with an total time of at lease one or more predetermine schedule portions or grace periods and generating and distributing an view-point signal to the A/V recording and communication apparatus 14 upon the one or more timers reaching an predetermine value of 00:00:00.

The behavior state duration timer file comprise biological information (e.g., such as an the individual name), an respective identifier that distinguish one respective behavior state duration timer file from another. Specifically, the timer associated with the behavior state duration application 26 is an virtual countdown timer that count downs from an predetermine value, in addition the timer may comprise an input format such as HH:MM:SS for hours (HH), minutes (MM) and seconds (SS).

Further, upon receipt of the behavior state duration application 26 obtaining at lease one predetermine schedule portion or grace period via the behavior state duration algorithm application 105, the behavior state duration application 26 generates an behavior state duration timer file and associates the file with an respective identifier, name of the individual and generates at lease one timer associated with an total time of an predetermine schedule portion or grace period.

For example, if the behavior state duration application 26 obtains the reduced first schedule portion total time 8:00 a.m. (start-time)–11:50 a.m. (end-time)=3.50 hr., and the second schedule portion total time 1 p.m. (start-time)–5 p.m. (end-time)=4 hr. mention above in reference to the behavior state duration algorithm application 26 discussion, the behavior state duration application 26 generates an first timer and second timer. The first timer is set for the reduced first schedule portion total time in the format of 3:50:00 hr., and second timer is set for the second schedule portion total time in the format of 4:00:00 hr. The first timer is set for the reduced first schedule portion total time and is configured to start counting down at the reduced first schedule portion start-time or upon associating the first timer with the reduced first schedule portion total time. Whereas, the second timer is set for the second schedule portion total time and is configured to start counting down at the second schedule portion start-time. The behavior state processing unit 46 may comprise an internal clock which may allocate the processor 44 to determine an current time and date to start the timers.

Further, upon one or more timers values reaching 0:00:00 the behavior state processing unit 46 is set to distribute an view-point signal to the A/V recording and communication apparatus 14 via the network 21, under the control of the processor 6.

The view-point signal(s) further instruct the A/V recording and communication apparatus 14 to reobtain biometric data of an subscriber associated with the view-point signal data, in cause of the subscriber terminal 1 being at its original behavior state upon its behavior state duration time elapsing.

For instance, if the subscriber is an student of the environment 100 and the subscriber first class is 9 a.m. (start time) to 10a.m. (end time), second class 10:30 a.m. (start-time) to 11:30 a.m. (end-time) and the third class 11:35 a.m. (start-time) to 12:35 p.m. (end-time). The behavior state duration algorithm application 105 obtains an report of the subscriber schedule data from the student classifier database 24, bifurcating the class schedule into respective portion(s) and preforms an equation task on the portion(s); wherein the first schedule data portion comprises the first class time range of 9 a.m. (start-time) to 10:00 a.m. (end-time), second schedule portion comprises the second class time range of 10:30 a.m. (start-time) to 11:30 a.m. (end-time) and the third schedule portion comprises the third class time range of 11:35 a.m. (start-time) to 12:35 p.m. (end-time). Secondly, the behavior state algorithm application 105 respectively preforms an equation task with an predetermine time associated with the first schedule portion and second schedule portion to determine an respective grace period; wherein the first schedule portion end-time 10:00 a.m. is subtracted by the second schedule portion start-time 10:30 a.m., 10:00 (fsp end-time)–10:30 (ssp start-time)=:30 grace period. Further, the behavior state algorithm application 105 respectively preforms an equation task with an predetermine time of the second schedule portion and third schedule portion to determine an respective grace period; wherein the second schedule portion end-time 11:30 a.m. is subtracted by the third schedule portion start-time 11:35 a.m., 11:30 (ssp end-time)–11:35 (tsp start-time)=:05 grace period.

For example, if the behavior state duration application 26 obtains the reduced first schedule portion total time 8:00 a.m. (start-time)–11:50 a.m. (end-time)=3.50 hr., and the second schedule portion total time 1 p.m. (start-time)–5 p.m. (end-time)=4 hr. mention above in reference to the behavior state duration algorithm application 26 discussion, the behavior state duration application 26 generates an first timer and second timer. The first timer is set for the reduced first schedule portion total time in the format of 3:50:00 hr., and second timer is set for the second schedule portion total time in the format of 4:00:00 hr. The first timer is set for the reduced first schedule portion total time and is configured to start counting down at the reduced first schedule portion start-time or upon associating the first timer with the reduced first schedule portion total time. Whereas, the second timer is set for the second schedule portion total time and is configured to start counting down at the second schedule portion start-time. The behavior state processing unit 46 may comprise an internal clock which may allocate the processor 44 to determine an current time and date to start the timers.

Further, upon one or more timers values reaching 0:00:00 the behavior state processing unit 46 is set to distribute an view-point signal to the A/V recording and communication apparatus 14 via the network 21, under the control of the processor 6.

The view-point signal(s) further instruct the A/V recording and communication apparatus 14 to reobtain biometric data of an subscriber associated with the view-point signal data, in cause of the subscriber terminal 1 being at its original behavior state upon its behavior state duration time elapsing.

The memory 29 further stores an environment state database (ESD) 73 that comprises data such as the behavior state at which the one or more subscriber terminals 1 may operate at upon the subscriber entering into the environment 100.

Specifically, the environment state database 73 relates to one or more behavior state signals the subscriber terminal 1 may obtain via the one or more VSIM servers 99 of the service provider.

For instance, an administrator of the environment 100 may access an web page or application via the internet from an external terminal such as an laptop or computer, the application or web page may be in association with the behavior state processing unit 46 via an external server. The application or web page may require the administrator to enter authentication credentials such as an password and user name for security purposes. Further, the application or web page may comprise of an drop-down menu or side menu panel labeled environment behavior state, that comprise of three behavior state options (e.g., "keywords") labeled "behavior state 1", "behavior state 2", and "behavior state 3". Furthermore, when the administrator chooses and selects the desired behavior state (e.g., "keywords") the "keyword" is distributed to the behavior state processing unit 46 where the environment state database 73 may be updated with the contextual obtained behavior state ("keyword") and the administrator may logout of the application or web page. In addition, the environment state database may be updated at an given period with an predetermine behavior state "keyword".

Referring to the database 15 associated with the behavior state processing unit 46, the database 15 can be configured to hold an substantial amount of data for analytical and comparison purposes.

Further, the database 15 can exist within the behavior state processing unit 46 as additional memory banks, a server or set of servers, one or more clients, or be distributed between one or more servers and a client. The database 15 includes an biometric data classifier database (BDCD) 34, employee classifier database (ECD) 28, virtual identification card database (VICD) 12, student classifier database (SCD) 24, miscellaneous database (MD) 45 and an user authentication database (UAD) 59.

The behavior state processing unit 46 may access the virtual identification card database (VICD) 12 to obtain biometric data, biological information and other information associated with an subscriber virtual identification card (VIC), in the event of authenticating an subscriber via the facial recognition tasker application 30; for instance, the facial recognition tasker application 30 may access the virtual identification card database 12 to preform an comprising task of the contextual biometric data with historical biometric data (e.g., digital image arranged on the virtual identification card), upon receipt of obtaining an suitable match the facial recognition tasker application 30 may also extract/collect other data associated with the virtual identification card such as the subscribers name and subscriber authentication key.

The behavior state processing unit 46 may distribute contextual biometric data to the biometric data classifier database (BDCD) 34 via obtaining contextual biometric data from one or more A/V recording and communication apparatus 14 and upon receipt of the facial recognition tasker application 30 determining an respective match of the contextual biometric data with an photo associated with an respective virtual identification card (VIC) stored in the (VICD) 12. Upon, receipt of obtaining biometric data via the A/V recording and communication apparatus 14 the behavior state processing unit 46 can generate an respective biometric data classifier file an associate the contextual biometric data within the biometric data classifier file and store it into the biometric data classifier database (BDCD) 34, additionally each respective biometric data classifier file may comprise an identifier.

The behavior state processing unit 46 may access the student classifier database (SCD) 24 to obtain data pertaining to an subscriber (e.g., student) predetermine schedule. The student classifier database 24 respectively stores biological information, and information relating to class scheduling times and locations of each respective class-room as an respective student classier file. For instance, the student scheduling data can be stored within the student classifier database 24 via an administrator of the environment 100 or other personnel's that handles the scheduling task, this data may also be input into the student classifier database 24 via an external terminal via an network.

The behavior state processing unit 46 may access the miscellaneous classifier database (MCD) 45 to obtain data pertaining to an subscriber (e.g., guest) predetermine schedule information. The miscellaneous classifier database 45 may also store the subscriber biological information, and information relating to an predetermine reason for visiting the environment 100. For instance, the visitor scheduling data can be stored within the miscellaneous classifier database 45 via an administrator of the environment 100 or other personnel's that handles the scheduling task, this data may also be input into the miscellaneous classifier database 45 via an external terminal via an network 21.

Furthermore, the behavior state processing unit 46 may access the employee classifier database (ECD) 28 to obtain data pertaining to an subscriber (e.g., employee) work schedule, the work schedule may be presented as daily or weekly. The employee classifier database (ECD) 28 respectively store biological information, contextual and historical data relating to event(s) of employee(s) such as clock-in and clock-out times, destination route(s) taking by employee(s) within the environment 100 and the employee(s) office/work location(s) within the environment 100. The employee data can be stored in the employee classifier database 28 as an employee classifier file. The employee data can be collected in real time from one or more image module(s) 14, time clock(s) or any other data collection component(s) configured to obtain and distribute data within the environment 100.

Additionally, the employee scheduling data may be stored within the employee classifier database 28 via an administrator of the environment 100 or other personnel's that handles the scheduling task, this data may also be input into the employee classifier database 28 via an external terminal via an network.

The behavior state processing unit 46 may access the user authentication database 59 to obtain and verify authentication credentials of an subscriber that has been authenticated via the facial recognition tasker application 30. The authentication credentials may comprise of an respective identifier and other data such as biological information (e.g., name and photo of the individual) and the authentication key. For instance, the behavior state processing unit 46 may distribute an subscriber authentication signal to the VSIM server 99 via the network 21, upon receipt the VSIM processor 53 may access the service provider database 60 and determine if the obtained data associated with the subscriber authentication signal (e.g., biological information and subscriber authentication key) matches with data stored in the service provider database 60 upon distributing an behavior state signal to the subscriber terminal 1 via the cellular network 37.

The behavior state processing unit 46, A/V recording and communication apparatus 14 and VSIM server 99 may communicate via the one or more network 21 or cellular network 37. The communication networks may involve the internet, a cellular communication network, a WI-FI network, a packet network, a short-range wireless network or another wired and/or wireless communication network or a combination of any of the foregoing. Furthermore, the behavior state processing unit 46 may communicate with the A/V recording and communication apparatus 14 and VSIM server 99 in data packets, messages, or other communications using a common protocol, (e.g., Hypertext Transfer Protocol (HTTP) and/or Hypertext Transfer Protocol Secure (HTTPS). The A/V recording and communication apparatus 14, time clock(s) and data collection component(s) may be configured to translate radio signals and video signals into formats better understood by the database 15. In conclusion, the behavior state processing unit 46 may include any appropriate combination of hardware and/or software suitable to provide the described above functionality's.

Furthermore, the memory(s) (29,39) storing application(s) (30, 26, 105) is an example of a computer program product, comprising a non-transitory computer usable medium having a computer readable program code adapted to be executed to implement a method, for example a method stored in the application(s) (30, 26, 105).

Figure 5:
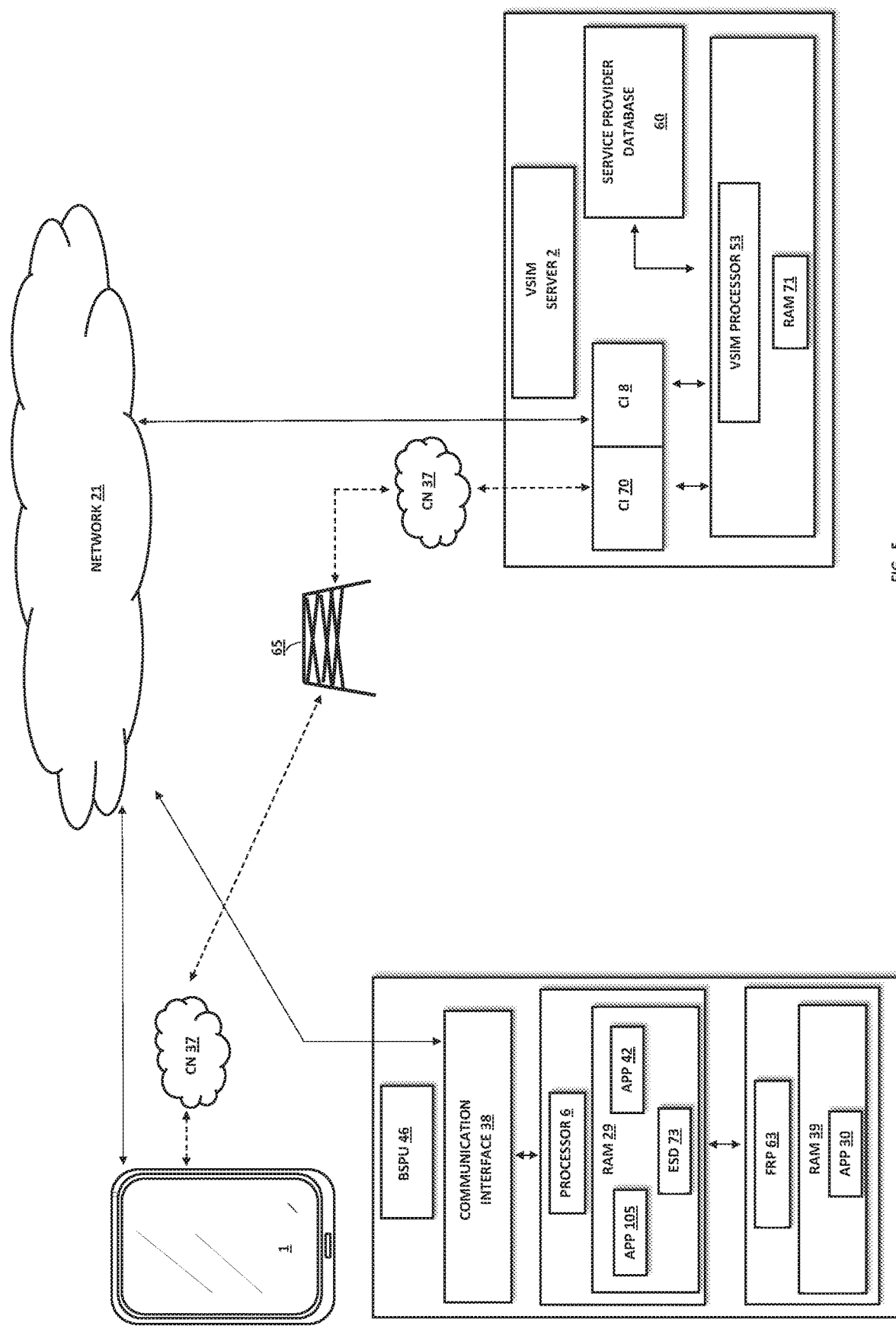
FIG. 5 illustrates the service provider Behavior State VSIM System in communication with the environment Terminal Behavior System.

FIG. 5 is a block diagram illustrating more in depth communications between the Terminal Behavior State Virtual SIM System of the service provider the one or more subscriber terminals 1 and the behavior processing unit 46. The service provider may comprise one or more VSIM servers 99 in communication with the one or more subscriber terminals 1 to distribute and obtain subscription information and distribute one or more behavior state signals to the one or more subscriber terminals 1 via the network 21 and cellular network 37.

Further, the VSIM server 99 includes one or more communication interfaces (70, 8) that can be provided as an interface card (sometimes referred to as "line cards"), that control the sending and receiving of data, data packets and behavior state signals over the network 21 and cellular network 37 to and from the one or more subscriber terminals 1 via an cellular tower 65, or another wireless communication network (e.g., Internet).

Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire, PCI, parallel, radio frequency (RF), cellular networks, Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces and high speed serial interface (HSSI) interfaces. Generally, such communication interfaces (70,8) may include ports appropriate for communication with the appropriate media. In some cases, they may also include an independent processor and, in some instances, volatile and/or nonvolatile memory (e.g., RAM). More specifically, communication interface 70 is used for communicating with the one or more subscriber terminals 1 via the cellular network 37 via the cellular tower 65, while communication interface 8 is used for communicating with the one or more subscriber terminals 1 and behavior state processing unit 46 via the network 21.

The VSIM server 99 includes an processor 23 comprising software or hardware or an combination of the two, the processor 23 may be configured to control a multitude of hardware or software components that may be connected thereon and may also perform various data processing and operations by executing an operating system, application program, or operating system and application instructions stored within the RAM 71.

In addition, the VSIM server 99 includes an service provider database 60 that stores an file for each respective subscriber operating on the system comprising data such as the subscriber name, unique identifier (e.g. telephone number), the subscribers authentication key 83 and other provisioning information etc. Further, each file stored in the service provider database 60 can be labeled (e.g., named) by the subscriber authentication key 83. The above mentioned data associated with the subscriber file stored within the service provider database 60 may be obtained from the subscriber terminal 1 during the service account creation/activation set-up of the service offered by the terminal service provider (TSP).

For instance, upon the service provider obtaining an subscriber authentication signal via the one or more VSIM servers 99 via the behavior state processing unit 46 via the network 21, the (VSIM) processor 23 may analyze the services provider database 60 to find an suitable match with the obtained contextual data associated with the subscriber authentication signal and historical data stored within the service provider database 60 in the event of distributing an behavior state signal (volume-control signal or power-down signal) to one or more subscriber terminals 1; examples of the comparable matching data may be any of one or an combination of the subscribers name, unique identifier (e.g., telephone number) and the subscriber authentication key 83.

The RAM 71 can comprises any suitable software or applications known to one skilled in the art(s) configured to respectively preform an comparing, matching and extracting task of data information as mentioned above.

The RAM 71 further store instructions and/or codes configured to determine an predetermine behavior state signal (volume-control signal or power-down signal) to distribute to the one or more subscriber terminals 1 upon obtaining an subscriber authentication signal comprising an respective "keyword" (e.g., "behavior state 1", "behavior state 2" or "behavior state 3") via the behavior state processing unit 46 under the control of the VSIM processor 23. For instance, the behavior state processing unit 46 may distribute an subscriber authentication signal to the VSIM server 99 via the network 21 comprising an "keyword" such as "behavior state 1", "behavior state 2", or "behavior state 3", further each keyword signifies an respective behavior state, keyword "behavior state 1" and "behavior state 2" can instruct the VSIM server 99 to distribute an behavior state signal (e.g., volume control signal) adjusting the one or more subscriber terminals 1 to silent mode or vibrate mode via the cellular network 37 under the control of the VSIM processor 23. Upon the subscriber terminal 1 obtaining the behavior state signal (e.g., volume control signal) the behavior state adjustment application 9 may determine an respective behavior state (e.g., determining an ringtone/notification volume adjustment tone/volume level position and output action threshold) the subscriber terminal 1 is to be adjusted to via the subscriber database 43. Alternatively, if the VSIM server 99 obtains an subscriber authentication signal comprising the "keyword" "behavior state 3" the VSIM server 99 can distribute an behavior state signal (e.g., power-down control signal) to the one or more subscriber terminals 1 causing the subscriber terminals 1 to go into an sleep mode under the control of the VSIM processor 23.

Referring to FIGS. 6A-6F illustrate exemplary graphical user interfaces showing an exemplary classifier file within the databases 15. The classifier files may comprise an plurality of fields for entering information such as the subscribers name, subscriber authentication key, schedule information, and phone number, etc.

Figure 6A:
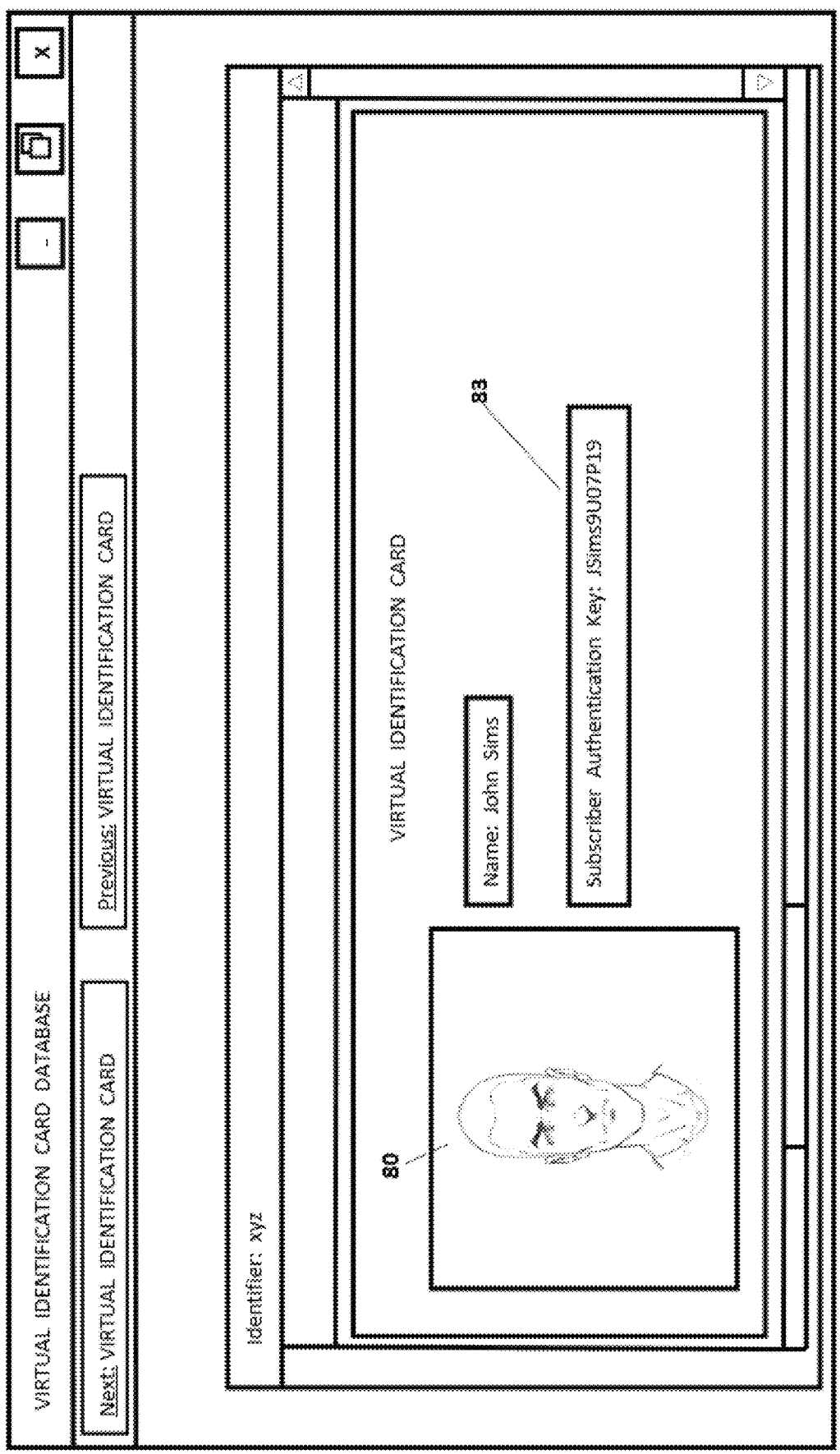
FIGS. 6A-6F illustrate exemplary graphical user interfaces that are useful for obtaining and storing an subscriber data and for displaying that data associated with an classifier file stored within one or more databases.

FIG. 6A shows an exemplary of an virtual identification card classifier file stored within the virtual identification card database (VICD) 12, the virtual identification card can comprise of biological data such as the subscribers first and last name, an digital image 80 of the subscriber and the subscriber authentication key 83 which is used to authenticate an individual via an biometric task via the facial recognition tasker application 30, and in the action of verifying an subscriber from within the server provider database 60. Each virtual identification card classifier file may comprise of its own respective identifier.

Figure 6B:
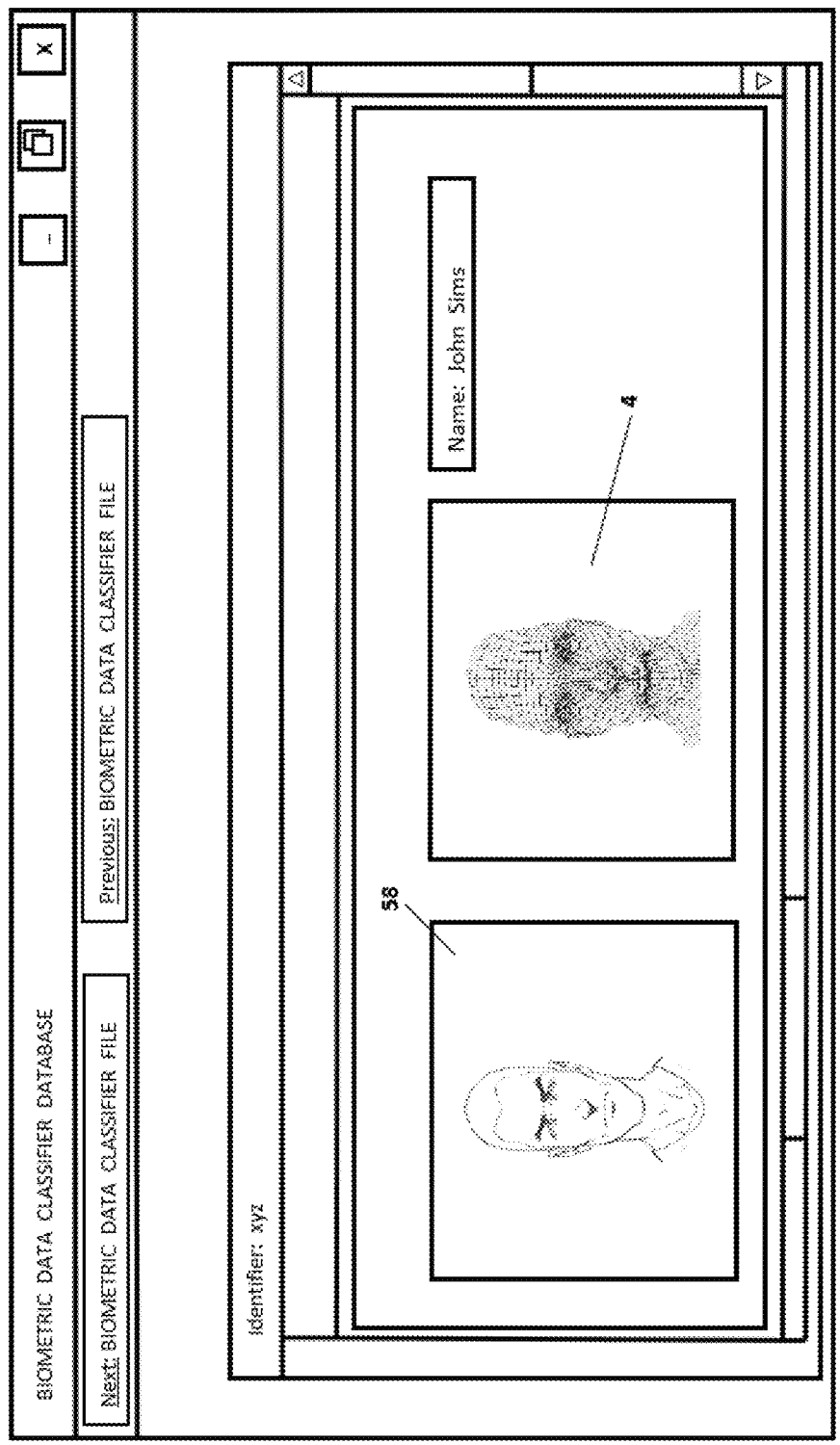

While FIG. 6B shows an exemplary of an biometric data classifier file stored within the biometric data classifier database (BDCD) 34, the biometric data classifier file comprise biological data such as the subscriber first and last name, an 2D or 3D image 58 and an face base mesh metadata 4 of the subscriber head and face upon the one or more A/V recording and communication apparatus 14 obtaining biometric data (e.g., image and depth data) of the subscriber when the subscriber comes within an predetermine region of the environment 100.

Figure 6C:
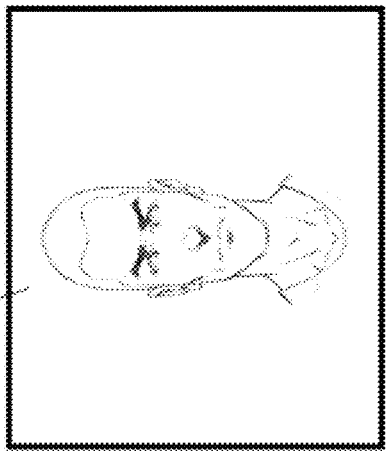

Further, FIG. 6C shows an exemplary of an student classifier file stored within the student classifier database (SCD) 103, the student classifier file comprises biological data such as the subscribers first and last name, an digital image 80 of the subscribers face and data relating to class scheduling times, dates, class locations and names of the instructors.

Figure 6D:
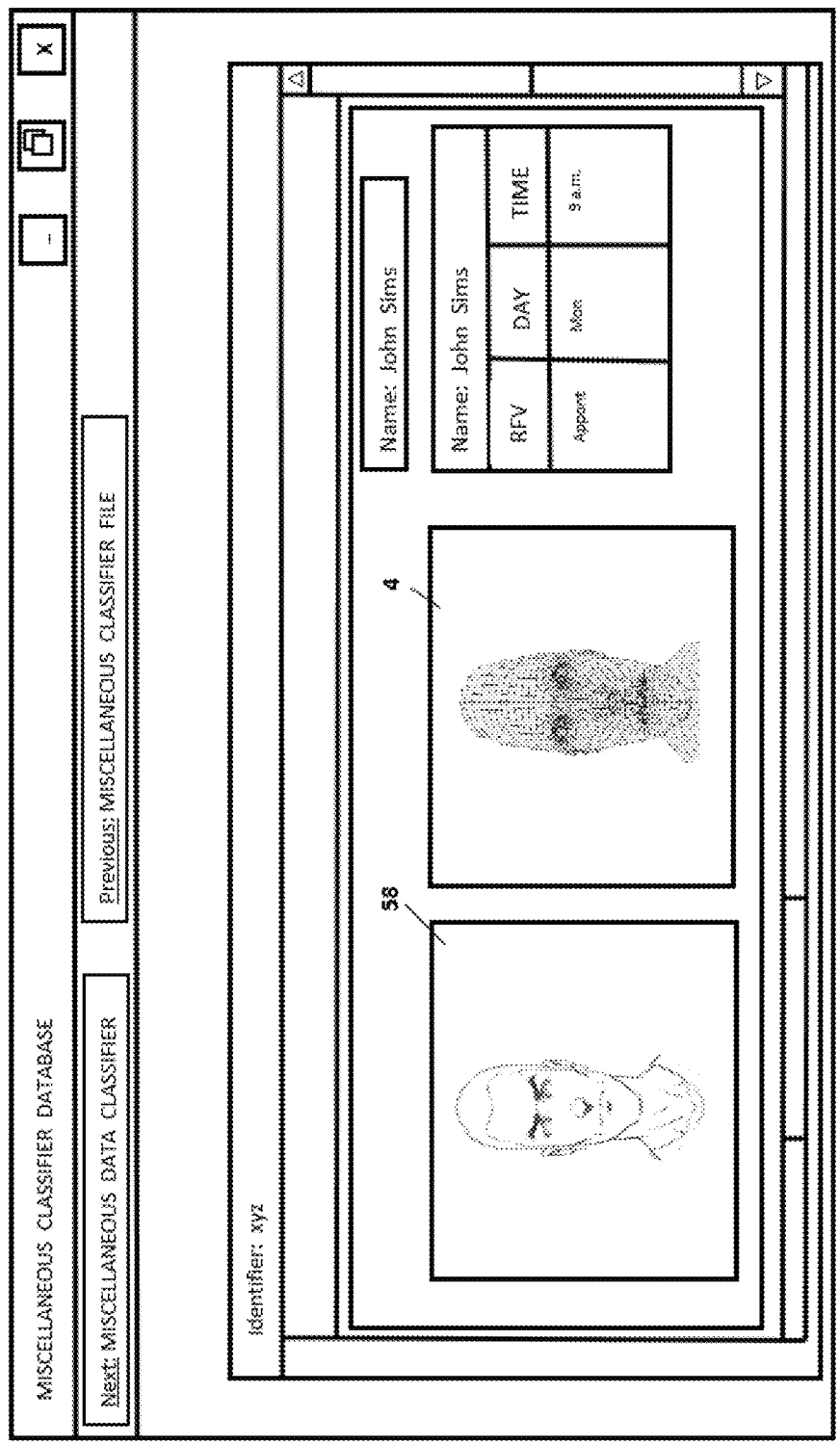

Referring to FIG. 6D shows an exemplary of an miscellaneous classifier file stored within the miscellaneous classifier database (MCD) 45, the miscellaneous classifier file comprises biological data such as the subscribers first and last name, an 2D or 3D faceprint 58 and face base mesh metadata 4 of the subscriber head and face upon the one or more A/V recording and communication apparatus 14 obtaining biometric data (e.g., image and depth data) of the subscriber when the subscriber comes within an predetermine region of the environment 100, data relating to the reason for visiting the environment 100 and the predetermine location at which the visitor is to reside during visiting the environment 100.

Figure 6E:
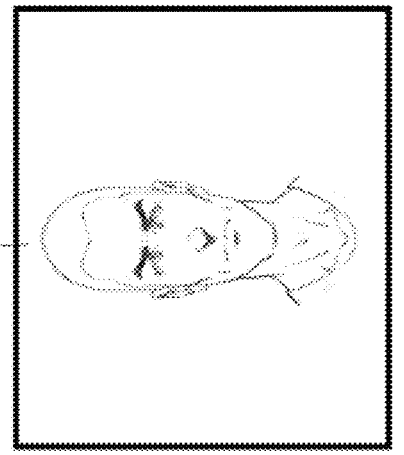

Furthermore, FIG. 6E shows an exemplary of an employee classifier file stored within the employee classifier database (ECD) 28, the employee classifier file comprises biological data such as the subscribers first and last name, an digital image 80 of the subscribers face and data relating to the subscriber work schedule time and date and also clock-in and clock-out times.

Figure 6F:
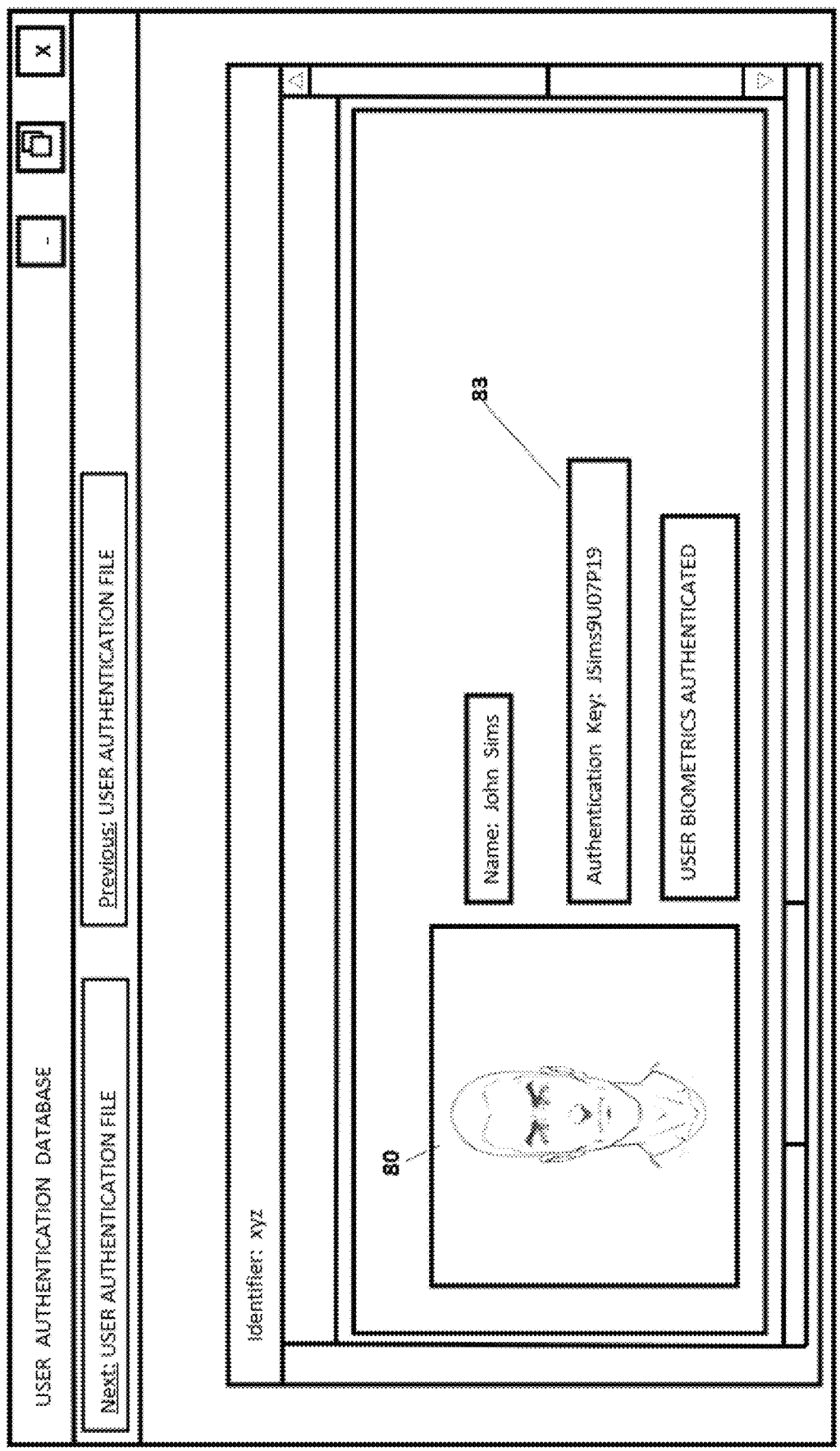

Furthermore, FIG. 6F shows an exemplary of an user authentication file stored within the user authentication database (UAD) 52, the user authentication file can comprises of biological data such as the subscribers first and last name, an digital image 80 of the subscriber face and an subscriber authentication key 83.

Figure 7A:
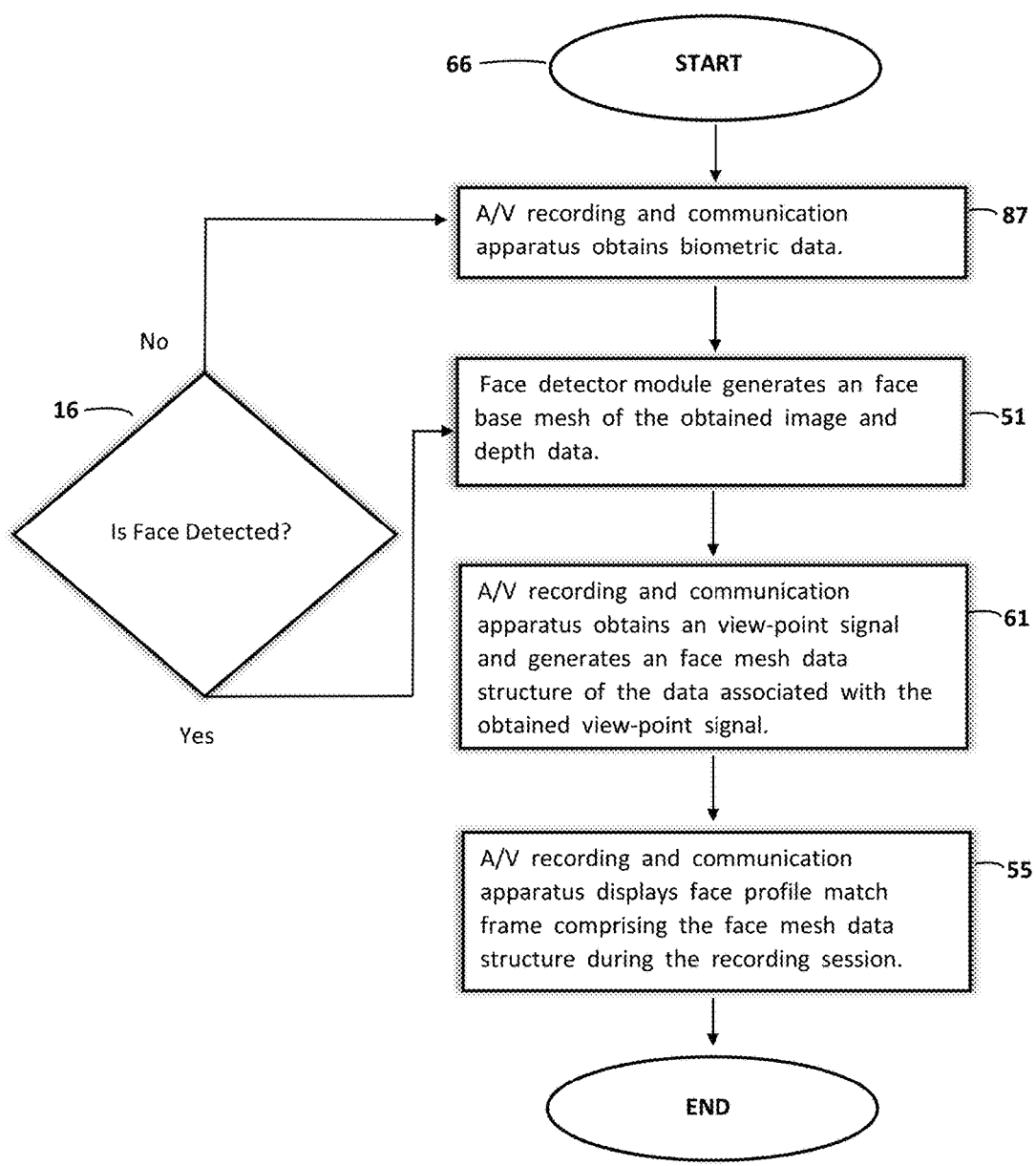
FIG. 7A illustrates an method for generating an face profile match frame (FPMF) in conjunction with face profile mesh data, and associating the face profile mesh data within the face profile match frame (FPMF).
Figure 7B:
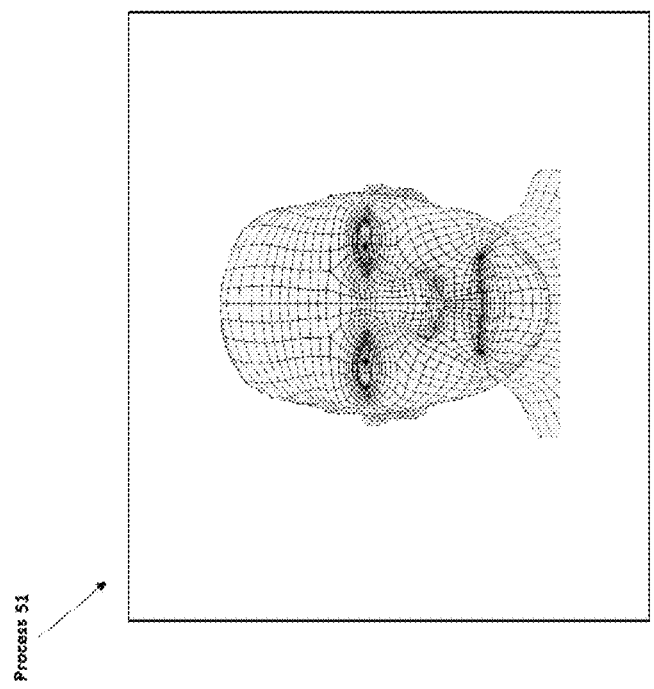
FIG. 7B-7D is an illustration of the method of FIG. 7A.
Figure 7B:
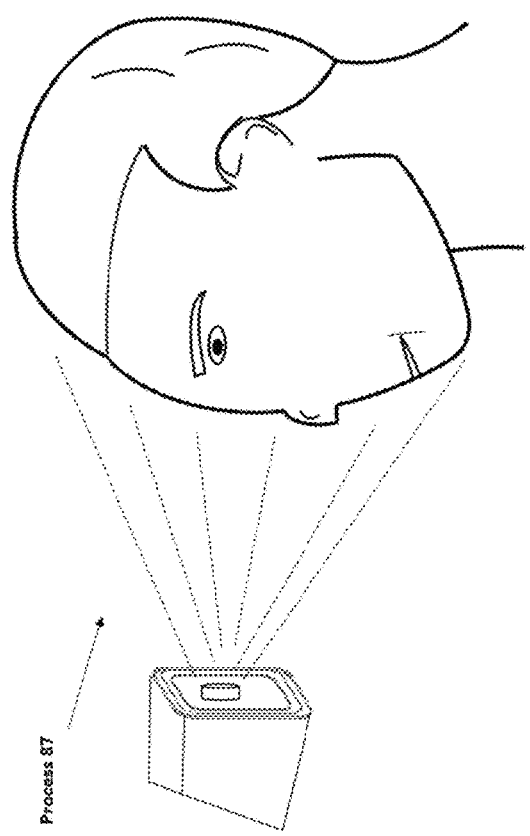
Figure 7C:
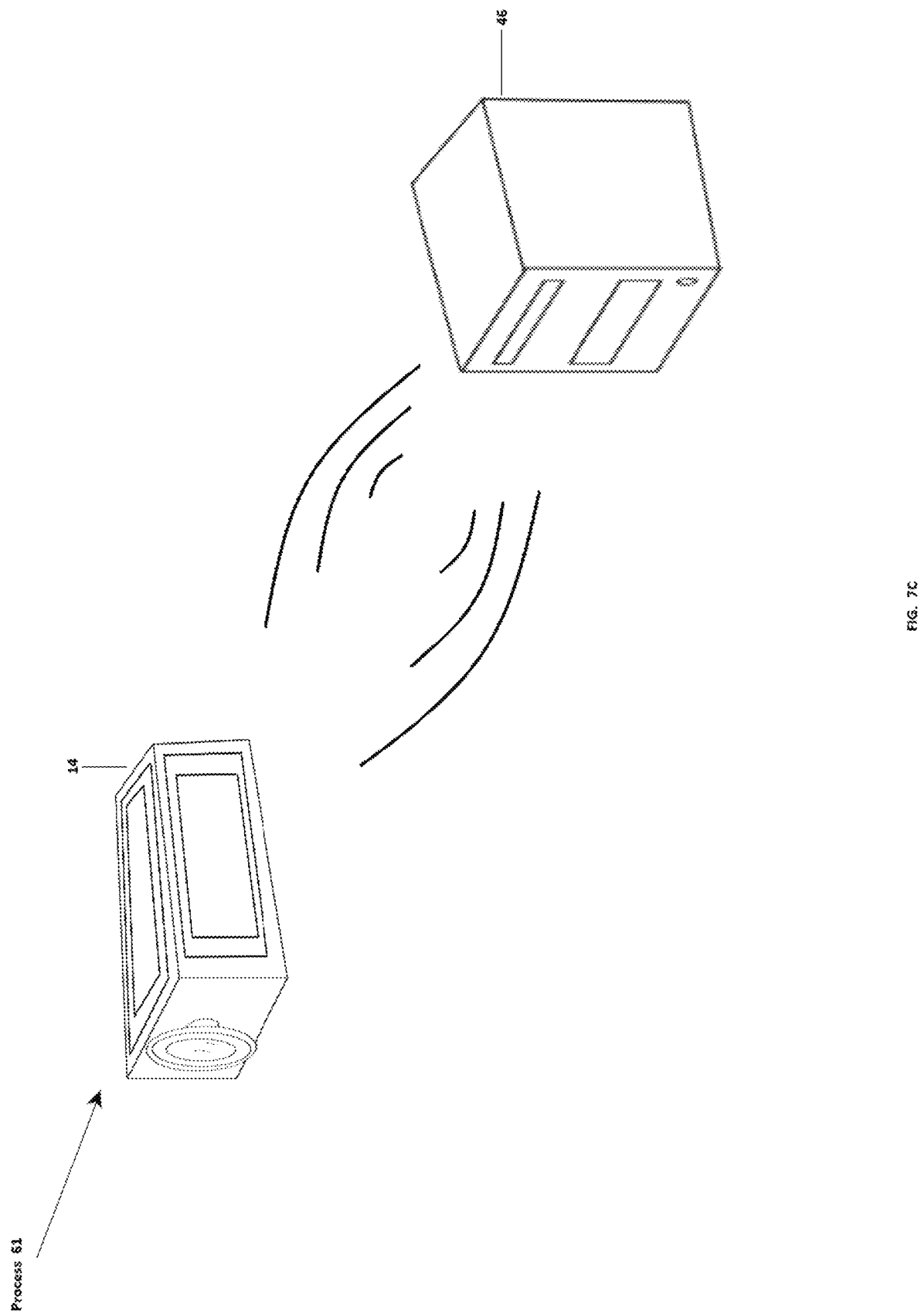
Figure 7D:
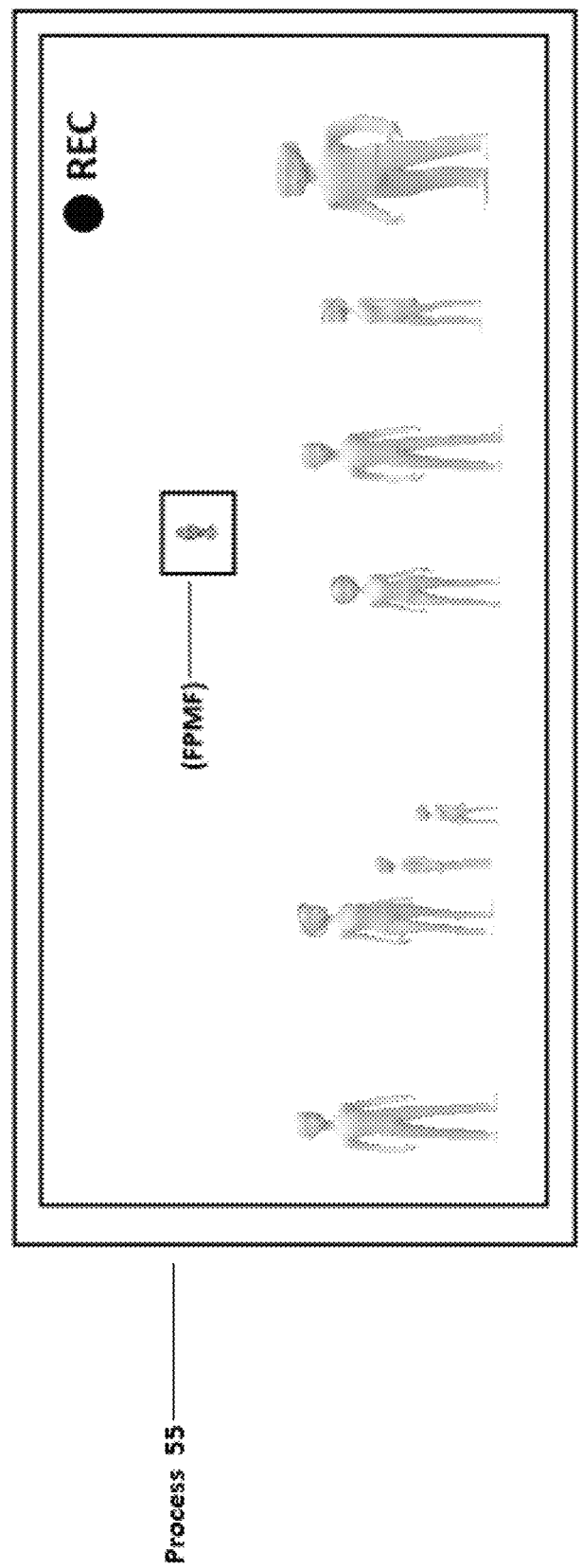

Referring to FIG. 7A, is an method 66 illustrating displaying an face profile match frame (FPMF) during the image capturing and/or recording process. The face frame module 40 is configured to generate an face profile match frame (FPMF) comprising an face mesh data structure (e.g., 3D depth data structure) of an respective subscriber in response to the A/V recording and communication apparatus 14 obtaining an view-point signal via the behavior state processing unit 46 via the network 21. The face profile match frame (FPMF) may be the likes of an face detection frame and object detection frame generated upon one component or sensor such as an image or depth sensor obtaining image and depth data of an subscriber when the subscriber comes within an predetermine distance of the A/V recording and communication apparatus 14.

In process 87, in response to the one or more subscribers arranging in the field of view of at lease one A/V recording and communication apparatus 14 and an recording session is initiated the face detector module 69 can obtain one or more frames of depth and/or image data via the image sensor and depth sensor associated with the A/V recording and communication apparatus 14, and may also be configured to determine if image and depth data has been obtained. Additionally, upon obtaining the image and depth data associated with the one or more subscribers the A/V recording and communication apparatus 14 is also configured to obtain an 3D or 2D image of the subscribers face and/or head and temporary store it in the memory 22 as data 13.

Further, in process 16, the one or more image or depth sensors associated with the A/V recording and communication apparatus 14 may be configured to determined whether the subscribers face or head has been detected. If image and depth data is detected, method 66 continues at process 51, otherwise method 66 continues at process 87 if image and depth data is not obtained.

In process 51, upon receipt of the face detector module 69 obtaining image and depth data, the face detector module 69 generates an face base mesh metadata of the subscribers face and/or head using one or more frames of the obtained image and depth data, and distributes the face base mesh metadata to the memory 22 storing it within the file with the 3D or 2D image of the subscribers face and/or head, and also distributing the face base mesh metadata and 2D or 3D image to the biometric data classifier database 34 via the behavior state processing unit 46 via the network 21 under the control of the processor 44.

In process 61, upon receipt of the behavior state processing unit 46 distributing an view-point signal to the A/V recording and communication apparatus 14, the AR module 77 obtains the data associated with the view-point signal such as the face base mesh metadata and the AR module 77 generates an face mesh data structure that represents an 3D depth profile of the face base mesh metadata. Further, the AR module 77 distributes the face mesh data structure to the characteristic module 11 where the characteristic module 11 generates characteristic point at areas of interest of the face mesh data structure upon completion the face mesh data structure is distributed to the characteristic algorithm module 48. Upon the characteristic algorithm module 48 obtaining the face mesh data structure the characteristic algorithm module 48 associates each respective or set of characteristic points with an value. Further, the characteristic algorithm module 48 distributes the face mesh data structure to the face frame module 40, in response to the face frame module 40 obtaining the face mesh data structure the face frame module 40 generates an face profile match frame (FPMF) comprising the obtained face mesh data structure. Upon the face frame module 40 generating the face profile match frame (FPMF) the face frame module 40 distributes the face profile match frame to the memory 22 and application 81.

In process 55, the application 81 is configured to obtain the face profile match frame (FPMF) and deploy the face profile match frame (FPMP) during the recording session. Further, during recording session the face profile match frame (FPMP) is configured to surround an subscribers face region upon the A/V recording and communication apparatus 14 detecting image and depth data. In addition, the face profile match frame (FPMP) is furthermore configured to alternate from one subscribers face to another until the A/V recording and communication apparatus 14 detects equivalent values of all characteristic points associated with the face profile match frame (FPMP) generated upon obtaining an view-point signal and the face profile match frame (FPMF) generated upon the A/V recording and communication apparatus 14 obtaining contextual biometric data (e.g., image and depth data).

Figure 8B:
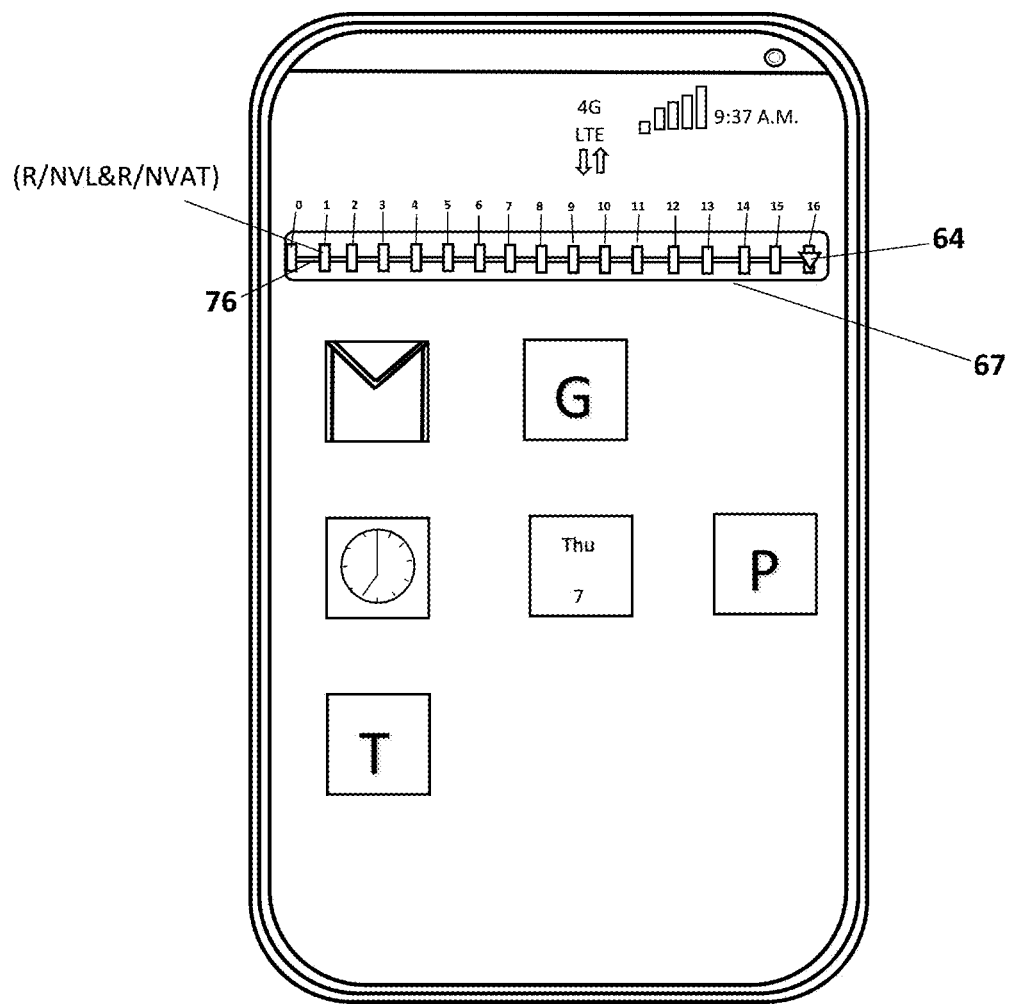
FIG. 8B illustrates an exemplary of the subscriber terminal in association with its interface displaying the sound bar/meter and other components that may be used during adjustment of the ringtone/notification volume adjustment according to one embodiment.

Referring to FIG. 8A shows an block diagram of the behavior state adjustment application (BSAA) 9 and the subscriber behavior state database (SBSD) 43 stored within the subscriber terminal 1 memory 7, while FIG. 8B illustrates an exemplary of subscriber terminal 1 interface displaying the ringtone/notification volume adjustment tones/volume level positions on the sound bar/meter 67 (R/NVAT/VL).

The subscriber behavior state database 43 comprise data which associates an respective behavior state with an respective ring-tone/notification volume adjustment tone (R/NVAT) volume level, additionally the ringtone/notification volume adjustment tone (R/NVAT) associated with an respective ring-tone/notification volume adjustment tone position that traditionally represents an position at which the ringtone/notification volume level (R/NVL) is set at indicated by an volume level marker 64 on the sound bar/meter 67 volume level indicator 76. As mentioned above with reference to FIG. 1; the subscriber terminal 1 can comprise of multiple ring-tone/notification volume levels (R/NVL) for example, the subscriber terminal 1 can comprise of, but is not limited to sixteen ringtone/notification volume levels (R/NVL) designated as "0", "1", "2", "3", "4", "5", "6", "7", "8", "9", "10", "11", "12", "13", "14", "15", "16" on the sound bar/meter 67 volume level indicator 76. Additionally, the subscriber terminal 1 can comprise of "16" ringtone/notification volume adjustment tones (R/NVAT) which respectively corresponds with the "16" ringtone/notification volume levels (R/NVAT), wherein upon adjusting the an ringtone/notification volume level (R/NVAT) the ringtone/notification volume adjustment tone (R/NVAT) is configured to output an beeping sound or the likes output via at lease one component of the input/output module 75 (e.g., speaker 74) in response to the user interacting with an physical button on the subscriber terminal 1 as mentioned above in FIG. 1.

The subscriber behavior state database 43 can store the ring-tone/notification volume adjustment tone "positions" on the sound bar/meter 67 as "0-16" and volume levels as "output action threshold" (e.g., threshold) which refers to the volume level of each respective ring-tone/notification volume adjustment tone, the subscriber behavior state database 43 can also store the subscriber terminal 1 original behavior state (OBS) prior to obtaining an behavior state signal. The subscriber terminal 1 may obtain the subscriber behavior state database 43 from the service provider VSIM server 99 upon the subscriber obtaining one or more subscription offered by the service provider.

For instance, when the behavior state adjustment application 9 request the subscriber terminal 1 original behavior state (OBS) (e.g., prior ringtone/notification volume level) the microphone 21 can obtain the contextual ring-tone/notification volume adjustment tone volume level via the speaker 74 and the sound measuring device 31 can measure the contextual ringtone/notification volume adjustment tone volume level, upon measuring the ring-tone/notification volume adjustment tone volume level the tone can be referenced and matched with an ring-tone/notification volume adjustment "output action threshold" and ringtone/notification adjustment tone position in the subscriber behavior state database 43 and stored within the subscriber behavior state database 43 as the original behavior state (OBS).

Figure 9:
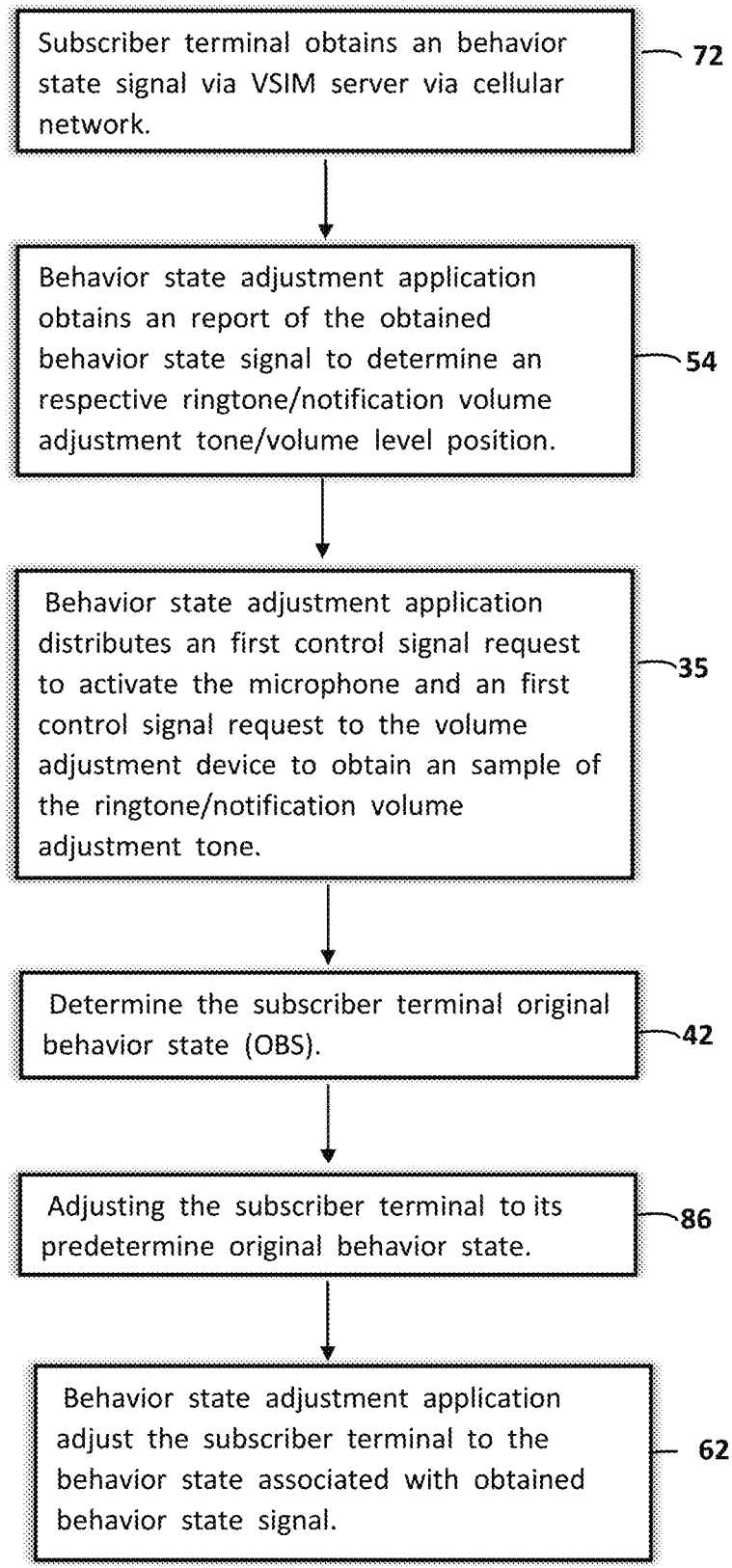
FIG. 9 illustrates an flow diagram of an method for adjusting the ringtone/notification volume levels of the subscriber terminal upon obtaining an behavior state signal.

Referring to FIG. 9, which depicts a flow diagram illustrating method for adjusting the ringtone/notification volume levels of the one or more subscriber terminals 1 in response to obtaining an behavior state signal (BSS) via one or more VSIM servers 99 of the service provider.

The subscriber terminal 1 comprises an behavior state adjustment application (BSAA) 9, volume adjustment device 49, microphone 17, sound measuring device 31, subscriber database 43, an input/output module 75 and an speaker 74.

Further, the one or more subscriber terminals 1 obtains an behavior state signal (e.g., volume control signal) via the service provider VSIM server 99 via the cellular network 37 (S72). Upon receipt of the subscriber terminal 1 obtaining an respective behavior state signal (e.g., volume-control signal) the behavior state adjustment application 9 obtains the behavior state volume control data associated with the obtained behavior state signal (e.g., behavior state 1 or 2) from the subscriber behavior state database 43, the behavior state volume control data is the ringtone/notification adjustment tone/volume level position on the sound bar/meter 67 and output action threshold (S54). For instance, if behavior state 1 is obtained the behavior state adjustment application 9 instructs one or more components of the subscriber terminal 1 to adjust the subscriber terminal 1 into silent mode/do not disturb mode which is equivalent to ringtone/notification volume adjustment tone/volume level position "0" on the sound bar/meter 67 and "output action threshold" T0 (e.g., ringtone/notification volume adjustment tone volume level), if behavior state 2 is obtained the behavior state adjustment application 9 instructs one or more components of the subscriber terminal 1 to adjust the subscriber terminal 1 to vibrate mode which is equivalent to ringtone/notification volume adjustment tone/volume level position "1" on the sound bar/meter 67 and output action threshold T1 (e.g., ringtone/notification volume adjustment tone volume level).

Furthermore, upon the behavior state adjustment application 9 determining the predetermine data associated with the obtained behavior state signal (e.g., volume-control signal) from the subscriber behavior state database 43, which is equivalent to the predetermine ringtone/notification volume adjustment tone/volume level position associated with the predetermine behavior state signal and "output action threshold" the behavior state adjustment application 9 sends an first control signal request to activate the microphone 17 for an predetermine time (e.g., 0.5 to 1 seconds) to obtain an sample of the ringtone/notification volume adjustment tone (R/NVAT).

During activation of the microphone 17 for the predetermine time of 0.5 to 1 seconds upon the microphone 17 obtaining the first control signal request, the microphone 17 is configured to obtain an sample of the ringtone/notification volume adjustment tone volume level to determine the subscriber terminal 1 original behavior state (OBS).

More of, the behavior state adjustment application 9 sends an first control signal request to the volume adjustment device 49 in conjunction with the microphone 17 first control signal request. During, adjustment of the volume adjustment device 49 upon the volume adjustment device 49 obtaining the first control signal request, the volume adjustment device 49 is instructed to adjust the ringtone/notification volume adjustment tone up by one volume level (e.g., one notch). In response to activation of the microphone 17 for an predetermine time and the volume adjustment device 49 adjusting the ringtone/notification volume up by one level the sound measuring device 31 measures volume levels of the ringtone/notification volume adjustment tone (R/NVAT), in response the behavior state adjustment application 9 obtains an respective measurement report of the adjusted ringtone/notification volume adjustment tone via the sound measuring device 31 (S35).

Further, in response to the behavior state adjustment application 9 obtaining the measurement report of the adjusted ringtone/notification volume adjustment tone (AR/NVAT) volume level and an measurement report of the obtained behavior state signal data, wherein the measurement report comprises data indicated to the ringtone/notification volume adjustment tone/volume level ("volume adjustment tone position" and "output action threshold"). The behavior state adjustment application 9 first preforms one or more equation process to determine the subscriber terminal 1 original behavior state (OBS), wherein the adjusted ring-tone/notification volume adjustment tone "output action threshold" (A/RNVATOAT) is subtracted by 1, which represents the number at which the volume adjustment device 49 adjusted the ringtone/notification volume adjustment tone up by upon obtaining the first control signal request; AR/NVATOAT−1=(OBS)), upon determining the original behavior state (OBS) the behavior state adjustment application 9 distributes and stores the subscriber terminal 1 original behavior state (OBS) within the subscriber behavior state database 43.

For, instance if the behavior state adjustment application 9 determines behavior state 2 (e.g., vibrate mode) is obtained which is equivalent to "ringtone/notification volume adjustment tone position" 1 and "output action threshold" T1, and the subscriber terminal 1 ringtone/notification volume adjustment tone current position is 8 on the sound bar/meter 67 and "output action threshold" is T8, in response to the volume adjustment device adjusting the ringtone/notification volume adjustment tone up by 1 volume level, in process to determine the original behavior state (OBS) in equation format the equation would be; adjusted ringtone/notification volume adjustment tone "output action threshold" (AR/NVATOAT) T8−1=T7 (OBS) (S42).

In response to the behavior state adjustment application 9 determining the subscriber terminal 1 predetermine original behavior state (OBS), the behavior state adjustment application 9 sends an second control signal request to the volume adjustment device 49. During, adjustment of the volume adjustment device 49 upon the volume adjustment device 49 obtaining the second control signal request, the volume adjustment device 49 is instructed to adjust the ringtone/notification volume adjustment tone down by one volume level (e.g., one notch), respectively adjusting the subscriber terminal 1 back to its original ringtone/notification volume adjustment tone position on the sound bar/meter 67 prior to the volume adjustment device 49 obtaining the first control signal request (S86).

In response to the behavior state adjustment application 9 adjusting the subscriber terminal 1 back to its original ringtone/notification volume level (R/NVL) position on the sound bar/meter 67, the behavior state adjustment application 9 preforms an one or more equation process to determine the obtained predetermine behavior state signal "ringtone/notification volume adjustment tone position" and "output action threshold" and adjust the subscriber terminal 1 to the behavior state associated with the obtained behavior state signal, wherein the adjusted ring-tone/notification volume adjustment tone "output action threshold" (AR/NVATOAT) is subtracted by the obtained behavior state "output action threshold" (BSOAT) associated with the obtained behavior state signal, wherein the equaled value represent the amount of control signal request the behavior state adjustment application 9 sends to the volume adjustment device 49 in order to adjust the subscriber terminal 1 to an behavior state associated with the obtained behavior state signal. In equation format the equation would be; (AR/NVATOAT)−(BSOAT)=(VACSR).

For, instance if the behavior state adjustment application 9 determines behavior state 2 (BS2) (e.g., vibrate mode) is obtained which is equivalent to "ringtone/notification tone position" 2 on the sound bar/meter 67 and "output action threshold" T2 within the subscriber database 43, and the subscriber terminal 1 ringtone/notification volume level currently positioned at 7 on the sound bar/meter 67 in response to the volume adjustment device adjusting the ringtone/notification volume level down one level to its original position upon obtaining the second control signal request, which is equivalent to "ringtone/notification tone position" 7, in process to determine the amount of control signal request the behavior state adjustment application 9 would need to distribute to the volume adjustment device 49 in order to adjust the subscriber terminal 1 to the behavior state associated with the obtained behavior state signal. In equation format the equation would be; adjusted ringtone/notification volume adjustment tone "output action threshold"(AR/NVATOAT) T8−(BSOAT) T2=6 (VACSR).

Upon receipt of the behavior state adjustment application 9 determining the amount of control signal request to send to the volume adjustment device 49, the behavior state adjustment application 9 distributes an first control signal request to the volume adjustment device 49, further if the behavior state adjustment application 9 determines the value at which the amount of control signal request (CSR) required to adjust the subscriber terminal 1 to an behavior state associated with the obtained behavior state signal (BSS) is greater than 1 (e.g., (CSR)>1), the behavior state adjustment application 9 distributes the control signal request at intervals of an predetermine time wherein the first control signal is distributed to the volume control device 49 followed by an corresponding control signal request at the predetermine interval of 05. to 1 seconds.

For example, if the behavior state adjustment application 9 determines that it would take an total amount of 6 control signal request (CSR) which is greater than one (e.g., 6>1) to adjust the subscriber terminal 1 to the behavior state associated with obtained behavior state signal 2 (BSS2), which is equivalent to ringtone/notification volume adjustment tone position" 1 on the sound bar/meter 67 and "output action threshold" T1, and the subscriber terminal 1 ringtone/notification volume level positioned at 7, in response to the behavior state adjustment application 9 distributing the six respective control signal request to the volume adjustment device 49, the volume adjustment device 49 decreases the ringtone/notification volume level position to 1 on the sound bar/meter 67, wherein the subscriber terminal 1 is now at behavior state 2 (BS2) vibrate mode (VM).

More of, if the subscriber terminal 1 obtains behavior state signal 2 (BS2) (e.g., vibrate mode) which is equivalent to "ringtone/notification volume level position" 1 on the sound bar/meter 67 and "output action threshold" T1 within the subscriber database 43, and the subscriber terminal 1 ringtone/notification volume level position at 1 on the sound bar/meter 67. Contrarily, the subscriber terminal 1 is already in vibrate mode prior to obtaining the behavior state signal (BSS) and the volume adjustment device 49 increasing the ringtone/notification volume adjustment tone by 1 volume level. Further, when the behavior state adjustment application 9 preforms the second equation process to determine behavior state signal 2 (BSS2) "ringtone/notification volume level position" and "output action threshold", wherein the adjusted ring-tone/notification volume adjustment tone (AR/NVAT) "output action threshold" is subtracted by behavior state 2 (BS2) "output action threshold" to determine the amount of volume levels the volume adjustment device 49 decreases the adjusted ring-tone/notification adjustment tone (e.g., (AR/NVAT) T2−(BS2) T2=00 (decibels), further the behavior state adjustment application 9 determines the subscriber terminal 1 is already at an state associated with behavior state 2 according to the equation value at 0 control signal request required to adjust the subscriber terminal 1 to the behavior state associated with the obtained behavior state signal (S62).

Figure 10:
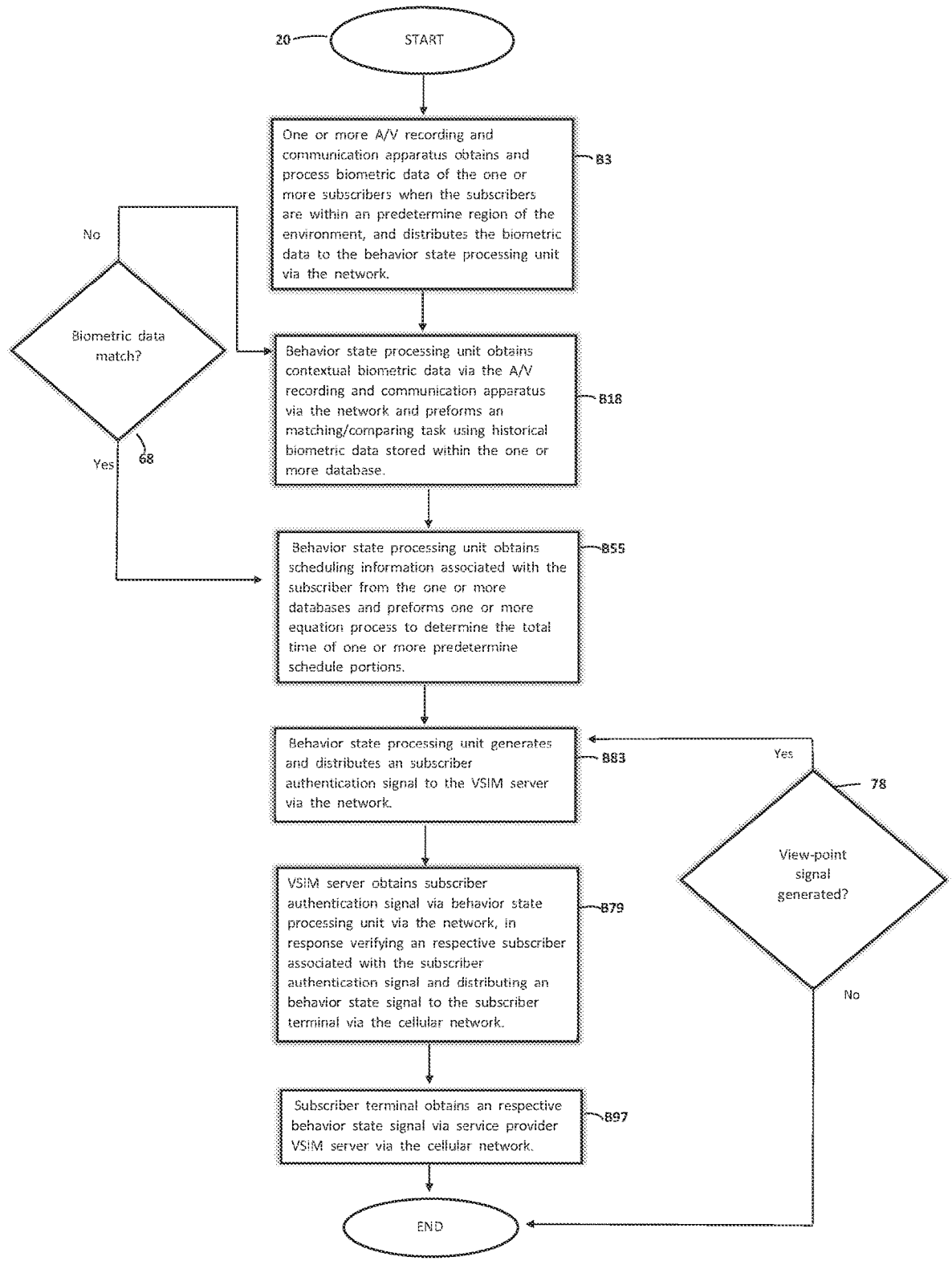
FIG. 10 illustrates an flow diagram of a method for distributing an behavior state signal to an subscriber terminal within the environment.

Referring to FIG. 10 is a simplified diagram of a method 20 for the one or more subscriber terminals 1 obtaining an behavior state signal (BSS) via the one or more VSIM servers 99 of the service provider via an network, when the one or more subscribers enters the environment 100. Any suitable system may be used, including the above mentioned Terminal Behavior System (TBS) and service provider Terminal Behavior State Virtual SIM System described herein note that any other systems known to one skilled in the arts may be used to accomplish the acts of method 20. Method 20 is further configured to obtain and process biometric data of one or more subscribers when the subscribers is within an predetermine region of the environment 100, upon receipt of the behavior state processing unit 46 processing the biometric data the one or more VSIM server 99 of the service provider distributes at lease one behavior state signal (e.g., volume-control signal or power-down control signal) to the one or more subscriber terminals 1 via the cellular network 37, in conjunction adjusting the subscriber terminal 1 behavior to an behavior associated with the distributed behavior state signal (BSS).

At block B3, when one or more subscribers is within an predetermine region of the environment 100 the one or more A/V recording and communication apparatus 14 obtains biometric data of the one or more subscribers. The predetermine region can be the main entrance or main lobby of the environment 100. Additionally, the biometric data is image an depth data obtained via an image and depth sensor associated with the one or more A/V recording and communication apparatus 14.

Upon receipt of the A/V recording and communication apparatus 14 obtaining the image and depth data the face detector module 69 processes the biometric data in time in frames (e.g., such that the image data can be obtained by the face detector module 69 can be at 60 frames/second (fps), and depth data can be obtained at 15 fps).

Specifically, the A/V recording and communication apparatus 14 face detector module 69 obtains and process the biometric data (e.g., image and depth data) and generates an face base mesh metadata of the subscriber head and face. Further, upon the face detector module 69 generating the face base mesh metadata, the face base mesh metadata and 2D or 3D image of the subscriber face is distributed to the behavior state processing unit 46 via the network 21 under the control of the processor 6, where the behavior state processing unit 46 stores the face base mesh metadata and 2D or 3D image of the subscriber face within the biometric data classifier database 34. Alternatively, the face base mesh metadata is stored within the A/V recording and communication apparatus 14 memory 22.

At block B18, upon receipt of the behavior state processing unit 46 obtaining the face base mesh metadata and 2D or 3D image of the subscriber face via the one or more A/V recording and communication apparatus 14 over the network 21, generating an biometric data classifier file, associating the obtained face base mesh metadata and 2D or 3D image of the subscriber face within the biometric data classifier file and storing the biometric data classifier file within the biometric data classifier database 34.

Additionally, upon then behavior state processing unit 46 obtaining the face base mesh metadata and 2D or 3D image of the subscriber face, the facial recognition tasker application 30 obtains the 2D or 3D image of the subscribers face from the biometric data classifier file stored in the biometric data classifier database 34 under the control of the facial recognition processor 63.

In conjunction, the facial recognition tasker application 63 analyzes the virtual identification card database 12 to obtain an suitable match of identity with the 2D or 3D image of the subscriber face and an photo image associated with an respective virtual identification card stored in the virtual identification database 12. If the facial recognition tasker application 30 determines an suitable match of identity is found within the virtual identification card database 12 the facial recognition tasker application 30 distributes the facial recognition authentication credentials to the user authentication database 59 and stores the credentials as an user authentication file under the control of the facial recognition processor 63.

If the facial recognition tasker application 30 determines no match was found within the virtual identification card database 12 the facial recognition processor 63 can instruct the facial recognition tasker application 30 to execute an second facial recognition authentication session (step 68).

In addition to authenticating the subscriber via the facial recognition operation, the facial recognition tasker application 30 respectively analyzes the biometric data classifier database 34 and updates the biometric data classifier file associated with the 2D or 3D image of the subscriber face that was used to authenticate the subscriber with biological information (e.g., the name of subscriber). For instance, upon the facial recognition tasker application 30 analyzing the virtual identification card database 12 in search of an suitable match of identity of the 2D or 3D image of the subscriber face, in response to determining an suitable match the facial recognition tasker application 30 also collect (e.g., extract) biological data such as the subscriber name and data such as the subscriber, subscriber authentication key from the respective virtual identification card that the suitable match was found in and associate the data with one or more files such as the user authentication file and biometric data classifier file under the control of the facial recognition processor 63.

At block B55, upon receipt of authenticating the subscriber via the facial recognition tasker application 30, the behavior state processing unit 46 respectively access the employee classifier database 28, student classifier database 24, or miscellaneous database 45 to obtain scheduling information regarding the subscriber under the control of the processor 6. Upon receipt of the behavior state processing unit 46 obtaining scheduling data associated with the subscriber under the control of the processor 6, the behavior state algorithm application 105 obtains an report of the scheduling data and preforms one or more equation process to bifurcate the schedule data into at lease two portion and to determine an predetermine total amount of time of an predetermine schedule portion and grace period, as described above with reference to FIG. 4, wherein one predetermine schedule portion is subtracted by an opposing predetermine schedule portion to determine an total amount of time of an predetermine schedule portion (e.g., behavior state duration). Alternatively, one predetermine schedule portion start or end time is subtracted by an opposing predetermine schedule portion start or end time to determine an total amount of time of an grace period (e.g. behavior state duration).

Upon, the behavior state duration application 36 obtaining one or more predetermine schedule portions and/or grace periods total times via the behavior state algorithm application 105 under the control of the processor 6. The behavior state duration application 36 generates an behavior state duration timer file, in conjunction the behavior state duration application 36 generates one or more timers and associates the one or more timers with an predetermine total time of an predetermine scheduling portion or predetermine grace period (e.g., behavior state duration) under the control of the processor 6.

At block B83, upon receipt of authenticating one or more subscriber via the facial recognition tasker application 30, obtaining scheduling data and associating the one or more total times of an predetermine scheduling portion with the one or more timers the behavior state processing unit 46 respectively generates and distributes an subscriber authentication signal to the VSIM server 99 under the control of the processor 6 via the network 21. In process to distributing the subscriber authentication signal the behavior state duration processing unit 46 access the user authentication database 59 to obtain data indicating the subscriber biological information such as the subscriber name and subscriber authentication key, in conjunction the behavior state processing unit 46 access the behavior state duration application 36 to obtain data (e.g., total time of an predetermine schedule portion and predetermine grace period) associated with an respective timer associated with an behavior state duration timer file. The behavior state processing unit 46 also analyzes the environment state database 73 within the memory 29 to obtain an "keyword" (e.g., "behavior state 1", "behavior state 2", or "behavior state 3") that refers to an command that instructs the VSIM server 99 to distribute an respective behavior state signal (BSS) to one or more subscriber terminals 1 via the cellular network 37.

Specifically, the subscriber authentication signal comprises data indicated to the subscriber name subscriber authentication key, one or more total time of an predetermine schedule portion or predetermine grace period (e.g., the behavior state duration time) and an respective "keyword".

At block B79, upon receipt of the VSIM server 99 obtaining the subscriber authentication signal via the behavior state processing unit 46 via the network 21, the VSIM server 99 access the service provider database 60 to determine if the obtained contextual data associated with the subscriber authentication signal corresponds with the subscriber historical data stored within the service provider database 60 under the control of the VSIM processor 53. Specifically, the data used to determine an match by the VSIM processor 53 is the subscribers name and subscriber authentication key. Upon the VSIM processor 53 preforming one or more matching task of the obtained contextual data and historical data stored in the service provider database 60, the VSIM server 99 respective determines the "keyword" associated with the obtained subscriber authentication signal distributes an respective behavior state signal to the subscriber terminal 1 via the cellular network 37 under the control of the VSIM processor 53. More of, if the VSIM server 99 obtains an subscriber authentication signal comprising the "keyword" "behavior state 1" the VSIM server 99 distributes an behavior state signal (e.g., volume-control signal) that instruct the subscriber terminal 1 to adjust to silent mode. If the VSIM server 99 obtains an subscriber authentication signal comprising the "keyword" "behavior state 2" the VSIM server 99 distributes an behavior state signal (e.g., volume-control signal that instruct the subscriber terminal 1 to adjust to vibrate mode. And if the VSIM server 99 obtains an subscriber authentication signal comprising the "keyword" "behavior state 3" the VSIM server 99 distributes an behavior state signal (e.g., power-down control signal) that instruct the subscriber terminal 1 to adjust to an sleep mode. The behavior state signal comprises two portions an behavior state control signal (e.g., volume-control or power-down signal) which is an behavior at which the subscriber terminal 1 is to operate at, and an behavior state duration signal which is an predetermine time frame at which the subscriber terminal 1 is to operate at upon obtaining the behavior state signal. Specifically, the behavior state duration signal comprises data indicated to total time of an predetermine schedule portion or predetermine grace period (e.g., the behavior state duration time) obtained via the behavior state processing unit 46 determined by the behavior state algorithm application 105 and behavior state duration application 36. The behavior state signal (e.g., volume-control signal) can instruct the behavior state adjustment application 9 to adjust the subscriber terminal 1 to either silent mode which is equivalent to behavior state 1 or vibrate mode behavior state 2 depending on the respective "keyword" determined by the VSIM server 99 upon receipt of obtaining an subscriber authentication signal via the behavior state processing unit 46.

At block B97, upon receipt of the subscriber terminal 1 obtaining an respective behavior state signal via the VSIM server 99 via the cellular network 37, the subscriber terminal 1 obtains the behavior state signal and preform at an behavior state associated with the obtained behavior state signal. If the subscriber terminal 1 obtains an behavior state signal indicating behavior state 3 which is equivalent to an power-down control signal the subscriber terminal 1 goes into an sleep mode for an predetermine time frame associated with the behavior state duration signal. During sleep mode the subscriber terminal 1 timing circuitry may be aware of the time, date, and elapsed time this allocates the timing circuitry to reference the behavior state duration time with the time associated with the subscriber terminal 1 clock in order to repower-up the subscriber terminal 1 when the behavior state duration time elapse. Further, upon receipt of the subscriber terminal 1 obtaining the behavior state signal and behavior state duration signal, the behavior state duration signal notifies the subscriber terminal 1 timing circuitry the duration time at which the subscriber terminal 1 is to behave at an sleep state before repowering-up the subscriber terminal 1. The data associated with the behavior state duration signal is the total time of an predetermine schedule portion or predetermine grace period (e.g., the behavior state duration time).

Alternatively, if the subscriber terminal 1 obtains an behavior state signal indicating behavior state 1 or 2 which is equivalent to an volume-control signal (silent mode or vibrate mode) the subscriber terminal 1 ringtone/notification volume level (R/NVL) is adjusted to an predetermine position on the sound bar/meter 67, as described in reference to FIG. 8. More of, the predetermine position on the sound bar/marker 67 for behavior state 1 is ringtone/notification volume level (R/NVL) 0, and the predetermine position on the sound bar/marker 67 for behavior state 2 is ringtone/notification volume level (R/NVL) 1. Further, upon receipt of the subscriber terminal 1 obtaining the behavior state signal and behavior state duration signal, the behavior state duration application 26 obtains the data associated with the behavior state duration signal and generates an timer and associate the timer with an predetermine time, wherein when the timer reaches an predetermine value of 0:00:00 the processor 27 is configured to instruct the behavior state adjustment application 9 to adjust the subscriber terminal 1 back to its original behavior state (OBS) via the behavior state adjustment application 9 sending one or more control signal request to the subscriber terminal 1 volume adjustment device 49, as described in reference to FIG. 8.

The data associated with the behavior state duration signal is the total time of an predetermine schedule portion or predetermine grace period (e.g., the behavior state duration time).

At 78, in reference to the timer associated with the behavior state duration application 26 and timing circuitry of the subscriber terminal 1 and the timer associated with the behavior state duration application 36 of the behavior state processing unit 46, the timer associated with the behavior state duration application 26 and timing circuitry of the subscriber terminal 1 and the timer associated with the behavior state duration application 36 of the behavior state processing unit 46 is configured to operate and count equivalent to each other, so that when the timer associated with the subscriber terminal 1 behavior state duration application 26 reaches an value of 0:00:00 the timer associated with the behavior state duration application 36 of the behavior state processing unit 46 also reaches an value of 0:00:00. Or when the subscriber terminal 1 timing circuitry determines that the behavior state duration time associated with the behavior state duration signal elapses the timer associated with the behavior state duration application 36 of the behavior state processing unit 46 also reaches an value of 0:00:00 and elapses. Upon receipt of one or more timers associated with the behavior state duration application 36 reaching an predetermine value of 0:00:00 the behavior state processing unit 46 generates and distributes an view-point signal to the A/V recording and communication apparatus 14. B101, in process to distributing the view-point signal the behavior state processing unit 46 access the biometric data classifier database 34 and obtains the face base mesh metadata of the subscriber associated with the respective behavior state duration timer file timer that reached the predetermine value of 0:00:00, associating the face base mesh metadata with the view-point signal under the control of the processor 6.

The data associated with the view-point signal is the face base mesh metadata of the subscriber.

B102, upon receipt of the A/V recording and communication apparatus 14 obtaining the view-point signal via the behavior state processing unit 46 via the network 21, the augmented reality module 77 obtains the face base mesh metadata and generates an face mesh data structure (e.g., an 3D depth profile of the face and head), upon generating the face mesh data structure the augmented reality module 77 distributes the face mesh data structure to the characteristic module 11 under the control of the processor 44. Upon the characteristic module 11 obtaining the face mesh data structure via the augmented reality module 77, the characteristic module 11 detects facial features of the face mesh data structure and associate facial features of the face mesh data structure with characteristic points at areas of interest so that an value can be associated with the characteristic points and distributes the face mesh data structure to the characteristic algorithm module 48 under the control of the processor 44.

Further, upon the characteristic algorithm module 48 obtaining the face mesh data structure comprising characteristic points, the characteristic algorithm module 48 preforms an one or more equation task to determine an respective value for each respective or set of characteristic point(s) associated with the respective face mesh data structure, in response, to the characteristic algorithm module 48 associating an value with one or more characteristic points of the face mesh data structure the characteristic algorithm module 48 distributes the face mesh data structure to the face frame module 40 under the control of the processor 44.

Furthermore, upon the face frame module 40 obtaining the face mesh data structure via the characteristic algorithm module 48 the face frame module 40 generates an face profile match frame (FPMF) comprising the obtained face mesh data structure and distributes the face profile match frame (FPMF) to the memory 22 and application 81 under the control of the processor 44. For example, the face profile match frame (FPMF) may be the likes of an face or object detection frame displayed during an recording session upon one or more components of an A/V recording and communication apparatus 14 such as an image or depth sensor detecting image or depth data when an individual is within an predetermine field of view.

B102 upon, receipt of the face frame module 40 generating the respective face profile match frame (FPMF) and distributing the face profile match frame to the application 81, the application 81 respectively obtains the face profile match frame (FMPF) and displays the face profile match frame (FPMF) during the recording session. Further, during the recording session the face match profile frame (FMPF) is configured to alternate from an subscriber face to another subscriber face at an predetermine time of 1 to 2 seconds until the A/V recording and communication apparatus 14 obtains equivalent values of each set or respective characteristic points associated with the contextual face profile match frame generated upon the A/V recording and communication apparatus 14 obtaining biometric data (e.g., image and depth data) and the face profile match frame generated in response to the A/V recording and communication apparatus 14 obtaining the view-point signal under the control of the processor 44.

More of, upon the A/V recording and communication apparatus 14 detecting one or more faces in the field of view of during the recording session via the image or depth sensor associated with the A/V recording and communication apparatus 14, the face profile match frame (FPMF) surrounds the subscriber face for an predetermine time until image and depth data is obtained. Upon the A/V recording and communication apparatus 14 detecting image and depth data of the subscriber the face match profile frame surrounds the subscribers face for an predetermine time until image and depth data is obtained, the obtained image and depth data is then obtained and processed via the face detector module (FDM) 69 to generate an face base mesh data of the subscriber face, the augmented reality (ARM) module 77 to generate an face mesh data structure of the face base mesh data, the characteristic module (CM) 11 to detect facial features at areas of interest and associate the face mesh data structure with characteristic point at the areas of interest and the characteristic algorithm module (CAM) 48 to determine an number value for each respective or set of characteristic points of the face mesh data structure.

Upon receipt of the characteristic algorithm module (CAM) 48 determining an value for each respective and set of characteristic points, the characteristic algorithm module 48 distributes the face mesh data structure to the comparing module 82. Upon the comparing module 82 obtaining the contextual face mesh data structure generated in response to the A/V recording and communication apparatus 14 obtaining biometric data (e.g., image and depth data), the comparing module 82 also obtains the face mesh data structure generated in response to the A/V recording and communication apparatus 14 obtaining the view-point signal from within the memory 22 and preform an annalistic task to compare and determine equivalent values associated with the characteristic points of the contextual face mesh data structure and face mesh data structure associated with an face profile match frame (FPMF) generated in response to the A/V recording and communication apparatus 14 obtaining the view-point signal.

D103, where if equivalent values are not determined by the comparing module 82 the face match profile frame (FPMF) alternates to another subscriber face in the field of view of the recording until equivalent values are detected, and if equivalent values are determined the A/V recording and communication apparatus 14 distributes an view-point detected signal to the behavior state processing unit 46 via the network 21 under the control of the processor 44. Further, the view-point detected signal is configured to translate to the behavior state processing unit 46 that the one or more A/V recording and communication apparatus 14 has detected the subscriber associated with the viewpoint signal during the recording session.

For instance, during the detecting of an suitable match of biometric data with the face profile match frame (FPMF) the process may be for only an temporary time frame during the recording session such as 10 to 15 minutes before an view-point non detected signal is generated and distributed to the behavior state processing unit 46 under the control of the processor 44, wherein this signal indicates the one or more A/V recording and communication apparatus 14 could not find an suitable match of biometric data within the predetermine time frame.

B104 upon, the behavior state processing unit 46 obtaining the view-point detected signal the processor 6 is configured to first analyze the one or more timers of the behavior state duration application 26 associated with the subscriber to determine if the time associated with the one or more timers has elapsed, if so the processor 6 is configured to instruct the behavior state duration application 26 to generate an respective timer and set the timer for ten minutes 00:10:00 (e.g., behavior state duration time). This process repeats itself until the A/V recording and communication apparatus 14 generates and distributes an view-point non detected signal to the behavior state processing unit 46.

It should also be understood that the programs, modules, processes, methods, and the likes, described herein are but exemplary implementations and are not related, or limited, to any particular computer, apparatus, or computer programming language. Rather, various types of general-purpose computing machines or customized devices may be used with logic code implemented in accordance with the teachings provided, herein. Further, the order in which the methods of the present invention are performed is purely illustrative in nature. These methods can be performed in any order or in parallel, unless indicated otherwise in the present disclosure. The methods of the present invention may be performed in either hardware, software, or any combination thereof. In particular, some methods may be carried out by software, firmware, or macrocode operating on a single computer or a plurality of computers. Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure. The present invention has been described above with reference to preferred embodiments. However, those skilled in the art will recognize that changes and modifications may be made in these preferred embodiments without departing from the scope of the present invention. Other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

I claim:

1. An system for obtaining a behavior state signal upon a subscriber entering a environment comprising:
    a terminal comprising one or more memory communicably coupled to one or more processor(s), and wherein the one or more memory(s) stores a virtual sim card that allocates the subscriber to obtain the behavior state signal via a network based on authenticating the subscriber via facial recognition and the one or more processors executing instructions based on the predetermine behavior state signal obtained via the network; and wherein the one or more memory(s) further stores volume control data for adjusting a volume level of the terminal in response to obtaining the behavior state signal via the network and the one or more processor(s) executing the instruction to adjust the volume level of the terminal to the volume level based upon the predetermine behavior state signal obtained via the network and the volume control data stored on the one or more memory(s);
    a plurality of A/V recording and communication apparatus distributed throughout the environment, at least one of the plurality of A/V recording and communication apparatus configured to obtain biometric data of the subscriber in response to the subscriber entering the environment;
    obtain a view-point signal via a behavior state processing unit in response to one or more timers reaching a predetermine value, and wherein the view-point signal comprises data indicated to the subscriber, and wherein a application is configured to display a face base mesh metadata during a recording session in response to obtaining the view-point signal;
    a behavior state processing unit operatively coupled to the plurality of A/V recording and communication apparatus, a database, the behavior state processing unit and a VSIM server, the behavior state processing unit being configured to:
    compare a virtual representation of the subscriber face with the biometrics data obtained from the A/V recording and communication apparatus in response to the subscriber entering the environment in order to determine an suitable match of identity;
    obtain a schedule data, and wherein the schedule data is bifurcating into at least one schedule portion to perform at least one equation task in order determine a predetermine behavior state duration time and a behavior state duration grace period time;

generate the one or more timers in response to preforming the equation task to determine the schedule portion or grace period, and associating the one or more behavior state duration timers with a total time of the one or more predetermine schedule portions;

distribute a subscriber authentication signal to the VSIM server in response to determining an suitable match of identity of the subscriber and generating the one or more behavior state duration timers;

distribute the behavior state signal to the subscriber terminal via the network in response to determining an suitable match of identity of the subscriber, generating the one or more behavior state duration timers with the total time and obtaining the subscriber authentication signal, and wherein the terminal behavior is based upon a predetermine keyword included with the subscriber authentication signal;

generating and distributing the view-point signal to at least one of the A/V recording and communication apparatus based upon the one or more timers reaching the predetermine value; obtain a view-point detected or view point non-detected signal from at least one of the A/V recording and recording apparatus based upon if at least one of the A/V recording and recording apparatus obtains the biometrics data of the subscriber in response to obtaining the view-point signal; and wherein if the A/V recording and communication apparatus does obtain the biometrics data the view-point detected signal is distributed to the behavior state processing unit and the one or more timers is set to a time, and wherein if the A/V recording and communication apparatus doesn't obtain the biometrics data the view point non-detected signal is distributed to the behavior state processing unit and the subscriber terminal is adjusted to a original behavior state.

2. The system of claim 1, wherein the virtual representation of the subscriber face is a virtual image of the subscriber face on a virtual identification card, and wherein the virtual representation of the subscriber is stored in a virtual identification database.

3. The system of claim 1, wherein the schedule data is bifurcated into a first schedule portion and second schedule portion.

4. The system of claim 1, wherein a first schedule portion end-time is subtracted by a grace period reducing the first schedule portion end-time and a first schedule portion total time; and wherein a reduced first schedule portion start-time is subtracted by a reduced first schedule portion end-time to determine the total time of the reduced first schedule portion; and wherein a first schedule portion start-time is subtracted by the first schedule portion end-time; and wherein a second schedule portion start-time is subtracted by a second schedule portion end-time; and wherein a third schedule portion start-time is subtracted by a third schedule portion end-time; and wherein the first schedule portion end-time is subtracted by the second schedule portion start-time; and wherein the second schedule portion end-time is subtracted by the third schedule portion start-time.

5. The system of claim 1, wherein a first timer is set for the reduced first schedule portion total time.

6. The system of claim 1, wherein a second timer is set for the second schedule portion total time.

7. The system of claim 1, wherein the subscriber authentication signal data comprises a name, a subscriber authentication key, the at least one schedule portion predetermine total time and a respective "keyword".

8. The system of claim 1, wherein the VISM server distributes the behavior state signal via the cellular network via a cell tower.

9. The system of claim 1, wherein if the subscriber authentication signal comprises the "keyword" "behavior state 1" the subscriber terminal behavior is a silent mode; and wherein if the subscriber authentication signal comprising the "keyword" "behavior state 2" the subscriber terminal behavior is a vibrate mode; and wherein if the subscriber authentication signal comprising the "keyword" "behavior state 3" the subscriber terminal behavior is a sleep mode state.

10. The system of claim 1, wherein upon the one or more timers value reaching 0:00:00 the view-point signal is generated and distributed to at least one of the A/V recording and communication apparatus.

11. The system of claim 1, wherein the view-point signal data comprises the subscriber face base mesh metadata; and in response to obtaining the view-point signal the application is configured to display a face profile match frame (FMPF) during a recording session, and wherein the face profile match frame (FMPF) is generated and displayed based upon obtaining the subscriber face base mesh metadata from the behavior state processing unit and one or more modules generating the face profile match frame (FMPF).

12. The system of claim 1, wherein if at least one of the A/V recording and communication apparatus obtains biometric data of the subscriber in response to obtaining the view-point signal the one or more timers is set for ten minutes (00:10:00).

13. The system of claim 1, wherein the volume control data is a ringtone/notification adjustment tone/volume level position on a sound bar/meter and a output action threshold.

14. The system of claim 1, further comprising the subscriber terminal includes a microphone, a volume adjustment device, a sound measuring device coupled to the volume adjustment device, and the one or more memory(s) communicably coupled to the volume adjustment device configured to control the volume levels of the terminal in response to obtaining the behavior state signal via cellular network, said subscriber terminal configured to:

obtain by the microphone, a first control signal request to obtain a sample of the ringtone/notification volume adjustment tone volume level to determine the subscriber terminal original behavior state (OBS);

obtain by the volume adjustment device, the first control signal request to adjust the ringtone/notification volume adjustment tone up by one volume level;

executing one or more equations by a behavior state adjustment application, wherein a adjusted ring-tone/notification volume adjustment tone "output action threshold" is subtracted by 1, which represents a number at which the volume adjustment device adjusted the ringtone/notification volume adjustment tone up by upon obtaining the first control signal request;

adjusting by the volume adjustment device, wherein the ringtone/notification volume adjustment tone is adjusted down by one volume level adjusting the subscriber terminal back to the original behavior state in response to the volume adjustment device obtaining a second control signal request;

execute one or more equations by the behavior state adjustment application, wherein the adjusted ring-tone/notification volume adjustment tone "output action threshold" is subtracted by a "output action threshold"

wherein the output action threshold is based upon the obtained behavior state signal, and wherein a equaled value represent a amount of control signal request the behavior state adjustment application sends to the volume adjustment device in order to adjust the subscriber terminal to a behavior state associated with the obtained behavior state signal; and determining by the behavior state adjustment application an amount of control signal request required to adjust the subscriber terminal to operate at the behavior associated with the obtained behavior state signal, and wherein if the behavior state adjustment application determines a value at which the amount of control signal request required to adjust the subscriber terminal to the behavior associated with the obtained behavior state signal is greater than 1, the behavior state adjustment application distributes the control signal request at intervals of 0.5 to 1 seconds apart;

distributing, by the VSIM server, a behavior state signal to the subscriber terminal via a cellular network, and wherein the behavior state signal causes the subscriber terminal behavior to function at a predetermine state based upon the subscriber authentication signal obtained by the VSIM server;

obtaining, by the subscriber terminal, the behavior state signal via a cellular network;

obtaining, by the A/V recording and communication apparatus, a view-point signal via the behavior state processing unit in response to the one or more timers reaching a predetermine value; and wherein the viewpoint signal comprises face base mesh metadata, and wherein a application is configured to display a face profile match frame (FMPF) during a recording session, and wherein the face profile match frame (FMPF) is generated and displayed based upon obtaining the subscriber face base mesh metadata from the behavior state processing unit and a modules generating the face profile match frame (FMPF); and obtaining, by the behavior state processing unit, a view-point detected or view point non-detected signal from the one or more AV recording and recording apparatus based upon if the one or more A/V recording and recording apparatus obtains biometrics data of the subscriber during the recording session, and wherein if the one or more A/V recording and communication apparatus does obtain the biometrics data of the subscriber during the recording session the view point detected signal is distributed to the behavior state processing unit and the one or more timers is set, and wherein if the one or more A/V recording and communication apparatus doesn't obtain the biometrics data during the recording session the view point non-detected signal is distributed to the behavior state processing unit and the subscriber terminal is adjusted to a original state.

* * * * *